US012264806B1

(12) United States Patent
Yang

(10) Patent No.: US 12,264,806 B1
(45) Date of Patent: Apr. 1, 2025

(54) LIGHT FIXTURE WITH TRANSLUCENT BODIES

(71) Applicant: Wangs Alliance Corporation, Port Washington, NY (US)

(72) Inventor: Xiong Yang, Dongguan (CN)

(73) Assignee: Wangs Alliance Corporation, Port Washington, NY (US)

( * ) Notice: Subject to any disclaimer, the term of this patent is extended or adjusted under 35 U.S.C. 154(b) by 0 days.

(21) Appl. No.: 18/907,902

(22) Filed: Oct. 7, 2024

Related U.S. Application Data

(60) Provisional application No. 63/562,784, filed on Mar. 8, 2024.

(51) Int. Cl.

| | |
|---|---|
| ***F21V 17/08*** | (2006.01) |
| ***F21V 3/02*** | (2006.01) |
| ***F21V 19/00*** | (2006.01) |
| ***F21V 21/008*** | (2006.01) |
| *F21Y 113/00* | (2016.01) |
| *F21Y 115/10* | (2016.01) |

(52) U.S. Cl.
CPC ................ *F21V 17/08* (2013.01); *F21V 3/02* (2013.01); *F21V 19/003* (2013.01); *F21V 21/008* (2013.01); *F21Y 2113/00* (2013.01); *F21Y 2115/10* (2016.08)

(58) Field of Classification Search
CPC .......... F21V 17/08; F21V 17/102; F21V 3/02; F21V 19/003; F21V 21/008; F21V 5/06; F21S 8/065
See application file for complete search history.

(56) References Cited

U.S. PATENT DOCUMENTS

| | | | | |
|---|---|---|---|---|
| 5,144,541 | A * | 9/1992 | Schonbek | F21V 5/06 362/405 |
| 7,854,532 | B2 * | 12/2010 | Myers, Jr | F21V 17/04 362/249.14 |
| 7,909,491 | B2 * | 3/2011 | Hoets | F21S 8/06 362/382 |
| 2005/0052876 | A1 * | 3/2005 | Halverson | A45B 3/02 362/406 |
| 2005/0201089 | A1 * | 9/2005 | Lee | G02B 6/0008 362/227 |
| 2006/0157207 | A1 * | 7/2006 | Schonbek | F21S 8/065 160/332 |

(Continued)

*Primary Examiner* — Tracie Y Green
*Assistant Examiner* — Michael Chiang
(74) *Attorney, Agent, or Firm* — Weiss & Arons LLP

(57) ABSTRACT

Apparatus and methods for lighting. The apparatus may include a lighting assembly. The lighting assembly may include a light emitting diode ("LED") light source. The lighting assembly may include a support. The support may define a hole. The lighting assembly may include a translucent body. The translucent body may include a first extension that is configured to extend through the hole. The translucent body may define a protrusion. The first extension may extend from the protrusion. A second extension may extend from an opposite side of the protrusion. The protrusion may obstruct passage of the translucent body through the hole. The lighting assembly may include a frame. The frame may be spaced apart from the support. The frame may define a passage configured to receive the first extension. The first and second extensions may be parallel to each other.

91 Claims, 33 Drawing Sheets

(56) References Cited

U.S. PATENT DOCUMENTS

| | | | | |
|---|---|---|---|---|
| 2014/0268743 | A1* | 9/2014 | Park | F21V 7/00 211/49.1 |
| 2019/0390828 | A1* | 12/2019 | Kotovsky | F21V 13/04 |

* cited by examiner

LIGHT FIXTURE WITH TRANSLUCENT BODIES

CROSS-REFERENCES TO RELATED APPLICATIONS

This application is a nonprovisional application of U.S. Provisional Application No. 63/562,784, filed Mar. 8, 2024, which is hereby incorporated herein by reference in its entirety.

BACKGROUND

Light fixtures, including chandeliers, typically include ornamental bodies. The ornamental bodies typically serve to enhance the visual presentation of the light fixture and the room in which it is mounted. The ornamental bodies typically include varying shapes based on a consumer's preference. The ornamental bodies are typically made from glass and are typically coupled to the light fixture. Supporting the ornamental bodies in the light fixture typically includes fitting the ornamental bodies with dowels or collars. The use of dowels involves boring holes into the ornamental bodies, which may cause fractures in the ornamental bodies. Collars typically involve adhesive, which can become brittle and fail. Collars, if made of polymer, may become brittle and fail.

It would therefore be desirable to provide improved apparatus and methods for light fixtures including translucent bodies.

Figure 1:
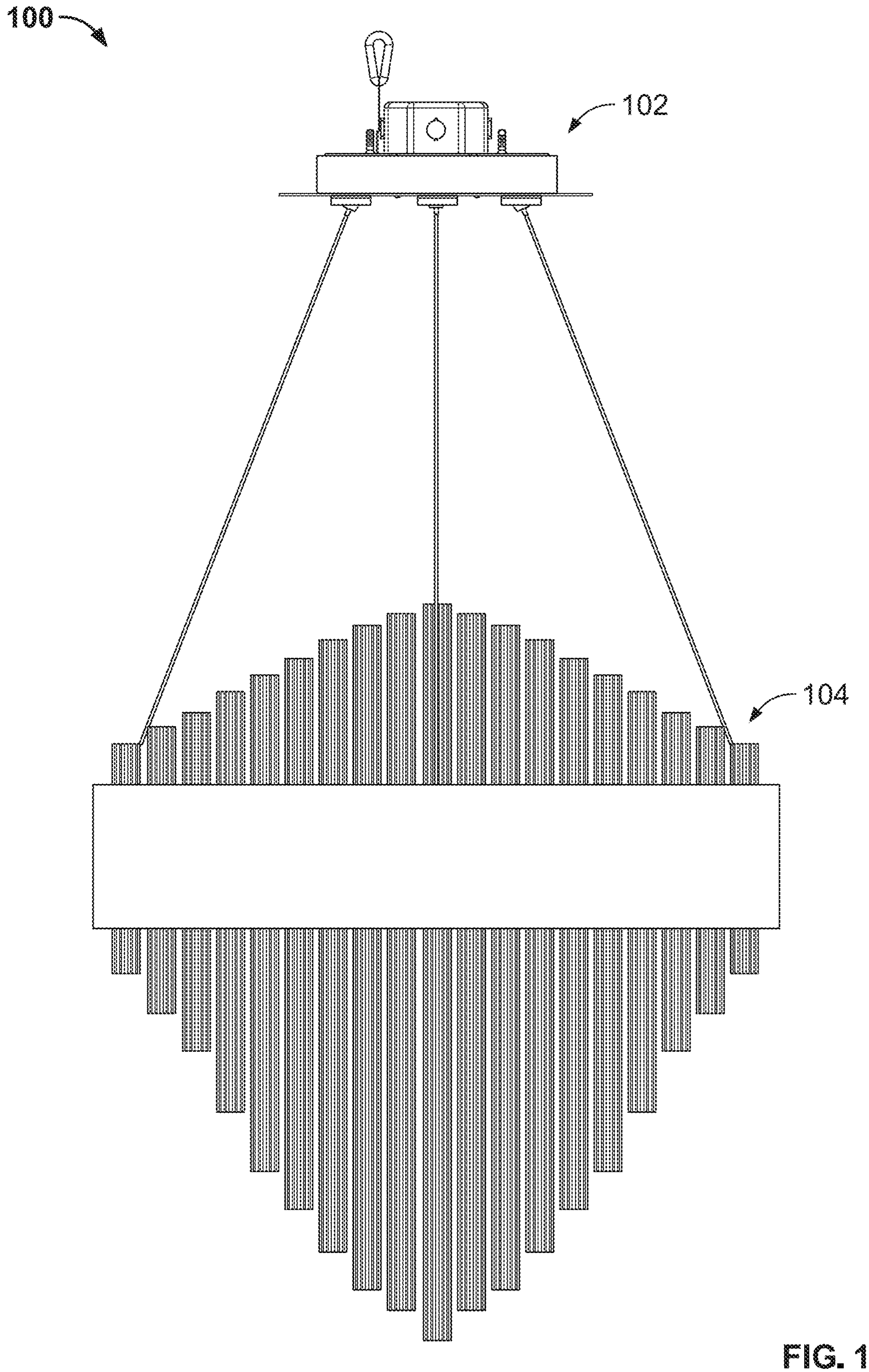
FIG. 1 shows illustrative apparatus in accordance with principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for lighting are provided. The apparatus may include a light fixture. The apparatus may include a light emitting diode ("LED") light source. The apparatus may include a support. The support may define a hole. The support may define a hole therein. The apparatus may include a translucent body. The translucent body may include a translucent material. The translucent material may be transparent. The translucent material may be partially opaque. The translucent material may include acrylic. The translucent material may include crystal. The translucent material may include glass. The translucent material may include a polymer.

The translucent body may include an extension. The extension may extend through the hole. The translucent body may define a protrusion. The extension may extend from the protrusion. The protrusion may obstruct passage of the body through the hole. Interference between the support and the protrusion may be the only force acting to obstruct the passage of the body through the hole. The extension and the protrusion may be monolithic.

The support may include a planar surface. The hole may intersect the surface. The apparatus may include a frame. The frame may be spaced apart from the support. The frame may define a passage. The passage may receive the extension.

The translucent body may include a longitudinal axis. The extension may be a first extension. The first extension may include a first diameter perpendicular to the axis. The translucent body may include a second extension. The second extension may extend from the protrusion. The second extension may include a second diameter perpendicular to the axis. The second extension may be monolithic with the protrusion and the first extension. The first diameter may equal the second diameter. The first and second diameters may be longitudinally constant along the first and second extensions, respectively.

The translucent body may include a wall. The translucent body may include a hollow region interior to the wall. The wall may define an inner diameter and an outer diameter. The first and second diameters may be inner diameters. The first and second diameters may be outer diameters. The outer diameter may be greater than the inner diameter.

The translucent body may include an interior region. The LED light source may be disposed outside the interior region. The LED light source may be detached from the translucent body. The apparatus may include a second translucent body. The second translucent body may define a second protrusion. The second translucent body may define a third extension which extends from the second protrusion. The support may define a second hole. The third extension may be configured to extend through the second hole. The second protrusion may obstruct passage of the second translucent body through the second hole. The first extension may include a first longitudinal length. The third extension may include a second longitudinal length. The second longitudinal length may be longer than the first longitudinal length.

The LED light source may be a first LED light source. The apparatus may include a second LED light source. The first LED light source may be configured to emit light through a first orifice defined by the support. The second LED light source may be configured to emit light through a second orifice defined by the support. The first hole and the second hole may be arranged in a row. The first orifice may be disposed between the first hole and the second hole.

The apparatus may include an LED base. The LED base may be spaced apart from the support. The LED light source may be disposed on the LED base. The LED base may be supported by a hanging wire.

The apparatus may include an insulating ring. The insulating ring may be attached to the LED base. The insulating ring may electrically insulate the LED base from the support. The insulating ring may be configured to support the support.

The apparatus may include a frame. The frame may be spaced apart from the support. The frame may define a passage. The passage may be configured to receive the first extension.

The apparatus may include a second LED base. The second LED base may be spaced apart from the frame. The second LED light source may be disposed on the second LED base. The first LED light source may be configured to emit light in a first direction. The second LED light source may be configured to emit light in a second direction opposite the first direction. The second LED light source may be configured to emit light through the second orifice in the frame. The first and second directions may be parallel to a central axis of the translucent body.

The apparatus may include a vertical spacer. The vertical spacer may include a first end and a second end. The first end may be attached to the first LED base. The second end may be opposite to the first end. The second end may be attached to the second LED base. The first LED base may support the second LED base via the vertical spacer.

The first LED light source may be connected to a first circuit board. The second LED light source may be connected to a second circuit board. The first circuit board may be disposed on the first LED base. The second circuit board may be disposed on the second LED base.

FIG. 1 shows illustrative fixture 100. Fixture 100 may include one or more of fixture base 102 and lighting assembly 104.

Figure 2:
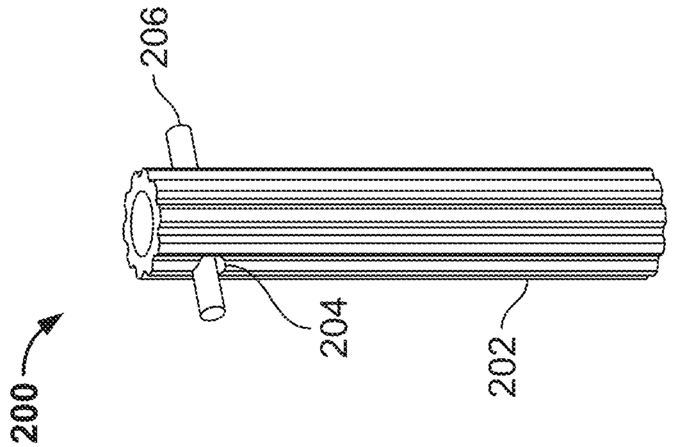
FIG. 2 PRIOR ART
FIG. 2 shows a prior art tube.

FIG. 2 shows prior art tube 200. Prior art tube 200 includes tube 202. Tube 202 includes bore 204. Rod 206 is disposed in bore 204.

Figure 3:
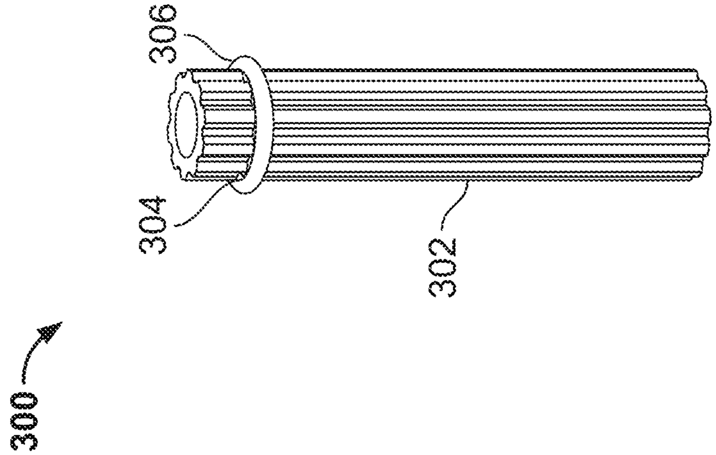
FIG. 3 PRIOR ART
FIG. 3 shows a prior art tube.

FIG. 3 shows a prior art tube 300. Prior art tube 300 includes tube 302. Tube 302 includes groove 304. Ring 306 is disposed in groove 304.

Figure 4:
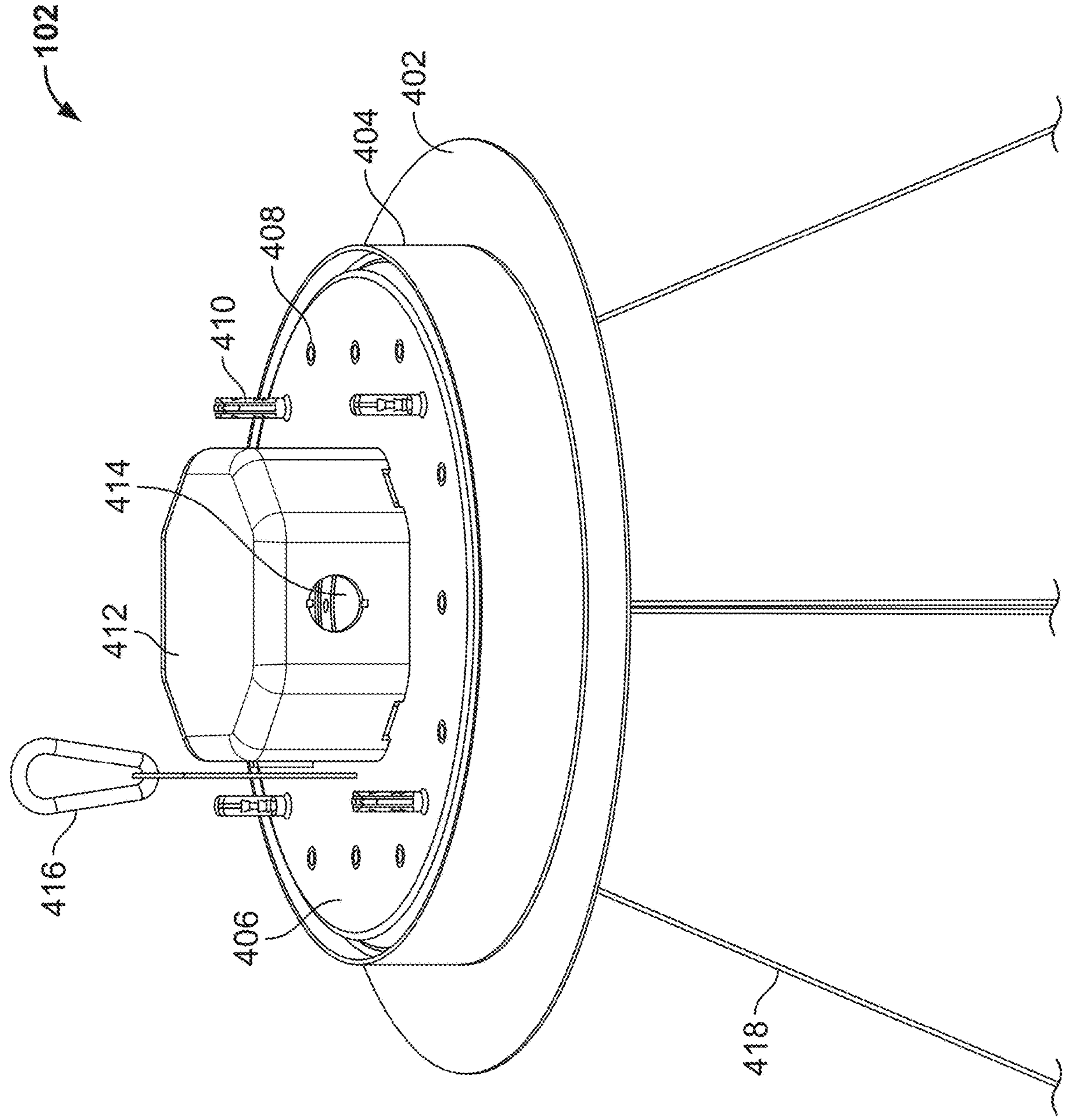
FIG. 4 shows illustrative apparatus in accordance with principles of the invention.

FIG. 4 shows a view of illustrative fixture base 102. Fixture base 102 may include one or more of bottom plate 402, canopy 404, mounting plate 406, screw holes 408, anchors 410, junction box 412, junction hole 414 and safety cord 416.

Bottom plate 402 may include a decorative plate. Canopy 404 may surround part or all of the electrical components that power fixture 100. Canopy 404 may connect to mounting plate 406. Canopy 404 may connect to mounting plate 406 by welding, fastening or any other suitable connection. Mounting plate 406 may be mounted to a surface. The surface may be a ceiling, an overhang, a beam, a standalone structure or any other suitable structure. The surface may include one or more of wood, metal, sheet rock, plaster or any other suitable material. Mounting plate 406 may be mounted to the surface via anchors 410. Anchors 410 may be appropriately selected to suit the material of the surface and the weight of fixture 100.

Junction box 412 may be fastened to mounting plate 406. Junction box 412 may receive supply cables therethrough. The supply cables may be connected to lead wires within junction box 412. The supply cables may supply power to the lead wires. The lead wires may supply power to fixture 100. Junction box 412 may define junction hole 414. Junction hole 414 may be sized to allow for the supply cables to enter junction box 412.

Safety cord 416 may connect to a safety structure within the surface. Safety cord 416 may provide an additional line of support for fixture 100.

Fixture 100 may include one or more wire ropes 418. Wire ropes 418 may be mounted to fixture base 102. Wire ropes 418 may support lighting assembly 104. Wire ropes 418 may include steel.

Figure 5:
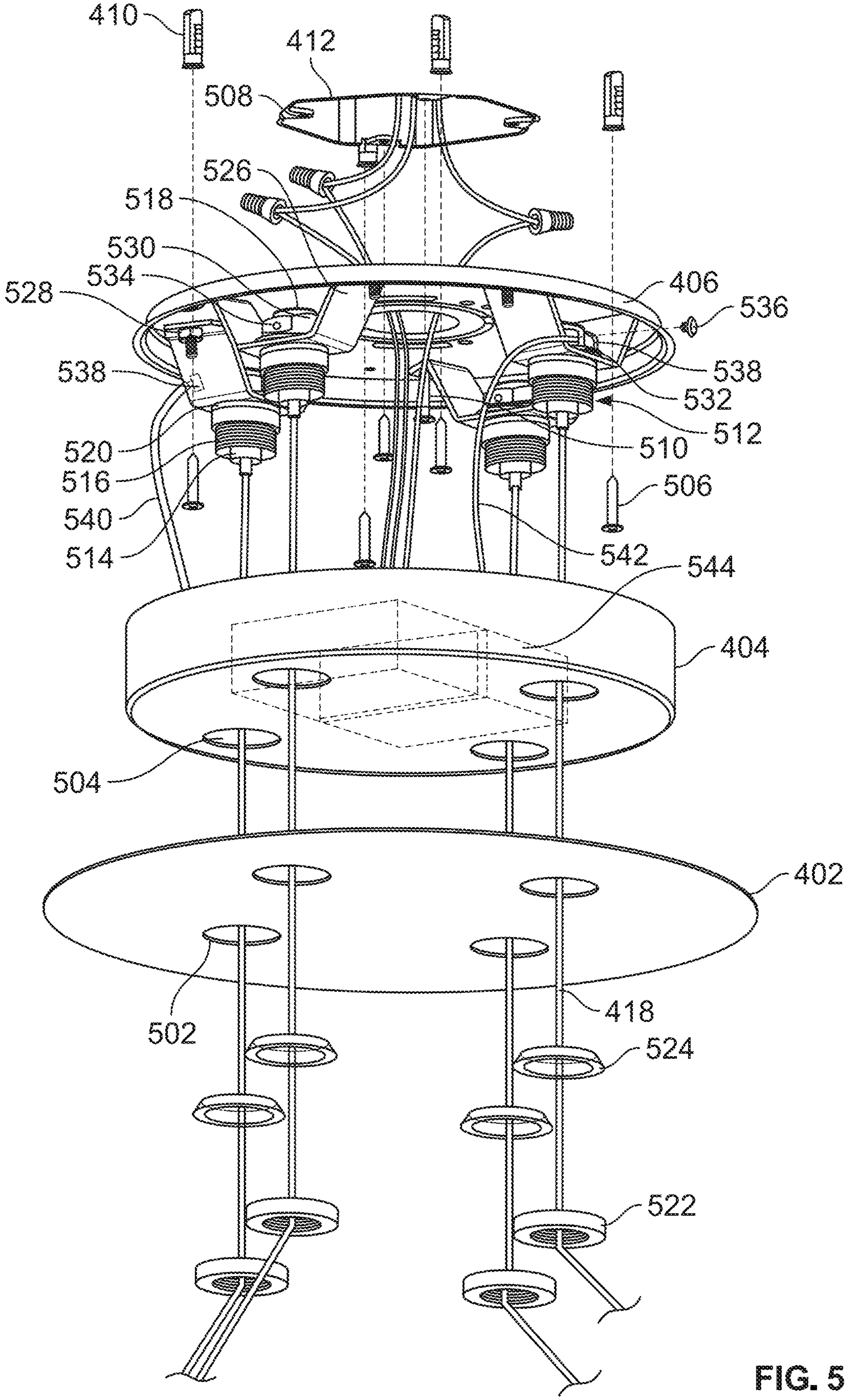
FIG. 5 shows illustrative apparatus in accordance with principles of the invention.

FIG. 5 shows an exploded view of illustrative fixture base 102. Bottom plate 402 may include holes 502. Holes 502 may allow for wire ropes 418 to pass through bottom plate 402. Canopy 404 may include holes 504. Holes 504 may allow for wire ropes 418 to pass through canopy 404. Mounting plate 406 may include holes to allow passage for one or more mounting screws 506. Mounting screws 506 may screw into corresponding anchors 410. Mounting screws 506 and anchors 410 may fix fixture 100 to the surface. Adhesives or additional screws may aid in fixing fixture 100 to the surface.

Junction box 412 may include one or more protruding tabs 508. Each protruding tab 508 may include a hole sized to accommodate a corresponding screw 510. Screws 510 may fasten junction box 412 to mounting plate 406.

Fixture base 102 may include one or more wire rope supports 512. The number of wire rope supports 512 may correspond to the number of wire ropes 418. Each wire rope support 512 may include one or more of adjustment swivel 514, swivel receptacle 516, inner cylinder 518 and gasket 520. Adjustment swivel 514 may support wire rope 418.

Wire rope 418 may be fixed to adjustment swivel 514 by welding or any other suitable type of connection. Wire rope 418 may be inserted through wire rope support 512 and fixed to mounting bracket 714.

Swivel receptacle 516 may support and hold adjustment swivel 514. Adjustment swivel 514 may swivel within swivel receptacle 516. Swiveling within swivel receptacle 516 may allow adjustment swivel 514 to support wire rope 418 at different angles. Supporting wire rope 418 at different angles may allow fixture base 102 to support lighting assemblies 104 having different diameters. Supporting wire rope 418 at different angles may allow fixture base 102 to support lighting assembly 104 at different heights.

Nut 522 may secure bottom plate 402 to canopy 404 and mounting plate 406 via wire rope supports 512. Gasket 524 may provide a seal between nut 522 and bottom plate 402. Gasket 524 may provide a seal between swivel receptacle 516 and bottom plate 402 and canopy 404. Gasket 524 may electrically insulate swivel receptacle 516 and nut 522 from bottom plate 402 and canopy 404.

Nut and bolt 528 may secure bracket 526 to mounting plate 406 via screw holes 408. A corresponding nut 530 may engage an upper portion of inner cylinder 518. Gasket 532 may provide a seal between nut 530 and bracket 526. Gasket 532 may electrically insulate nut 530 from bracket 526. Bracket 526 may be disposed between nut 530 and swivel receptacle 516. Locking nut 530 to inner cylinder 518 on the top of bracket 526 and locking swivel receptacle 516 to inner cylinder 518 on the bottom of bracket 526 may secure wire rope support 512 to bracket 526. Bracket 526 may be secured to mounting plate 406 via nut and bolt 528. In this manner wire rope 418 may be secured to mounting plate 406 via wire rope support 512 and bracket 526.

Each nut 530 may include bore 534. Bore 534 may receive screw 536. Screw 536 may secure ring terminal 538 to nut 530. Lead wire 540 may include a positive lead wire. Lead wire 540 may include a negative lead wire. Lead wire 542 may include an oppositely charged wire from lead wire 540. There may be a corresponding number of lead wires 540 as lead wires 542. There may be one lead wire 540 and one lead wire 542. First ends of lead wires 540 and 542 may terminate at driver 544. Second ends of lead wires 540 and 542 may terminate at corresponding ring terminals 538. Second ends of lead wires 540 and 542 may terminate within a wire cap. Corresponding wire ropes 418 may extend through wire rope support 512 and terminate within the respective wire caps. Lead wires 540 and 542 may include an electrically insulated sleeve.

Driver 544 may supply power to lead wires 540 and 542. Lead wires 540 and 542 may be in electrical communication with nuts 530. Nut 530 may be in electrical communication with inner cylinder 518. Inner cylinder 518 may be in electrical communication with swivel receptacle 516. Swivel receptacle 516 may be in electrical communication with adjustment swivel 514. Adjustment swivel 514 may be in electrical communication with wire rope 418.

Driver 544 may supply power to lead wires 540 and 542. Lead wires 540 and 542 may be in direct electrical communication with wire ropes 418 via a wire cap. In this scenario, each of lead wires 540 and 542 and wire ropes 418 may be encased within an electrically insulated sleeve. The electrically insulated sleeve may be made from plastic or silicon.

Wire rope 418 may be in electrical communication with lighting assembly 104.

There may be four wire ropes 418. There may be two wire ropes 418 in electrical communication with driver 544. One of the two wire ropes 418 may be a positive conductor. One of the two wire ropes 418 may be a negative conductor. The two wire ropes 418 may be on opposite sides of fixture base 102.

Driver 544 may be an Underwriters Laboratories ("UL") Class 2 driver. Driver 544 may output voltage less than or equal to 36V. Driver 544 may electrify wire ropes 418. The output voltage and current supplied by driver 544 to electrify wire ropes 418 may be regulated for user safety.

Figure 6:
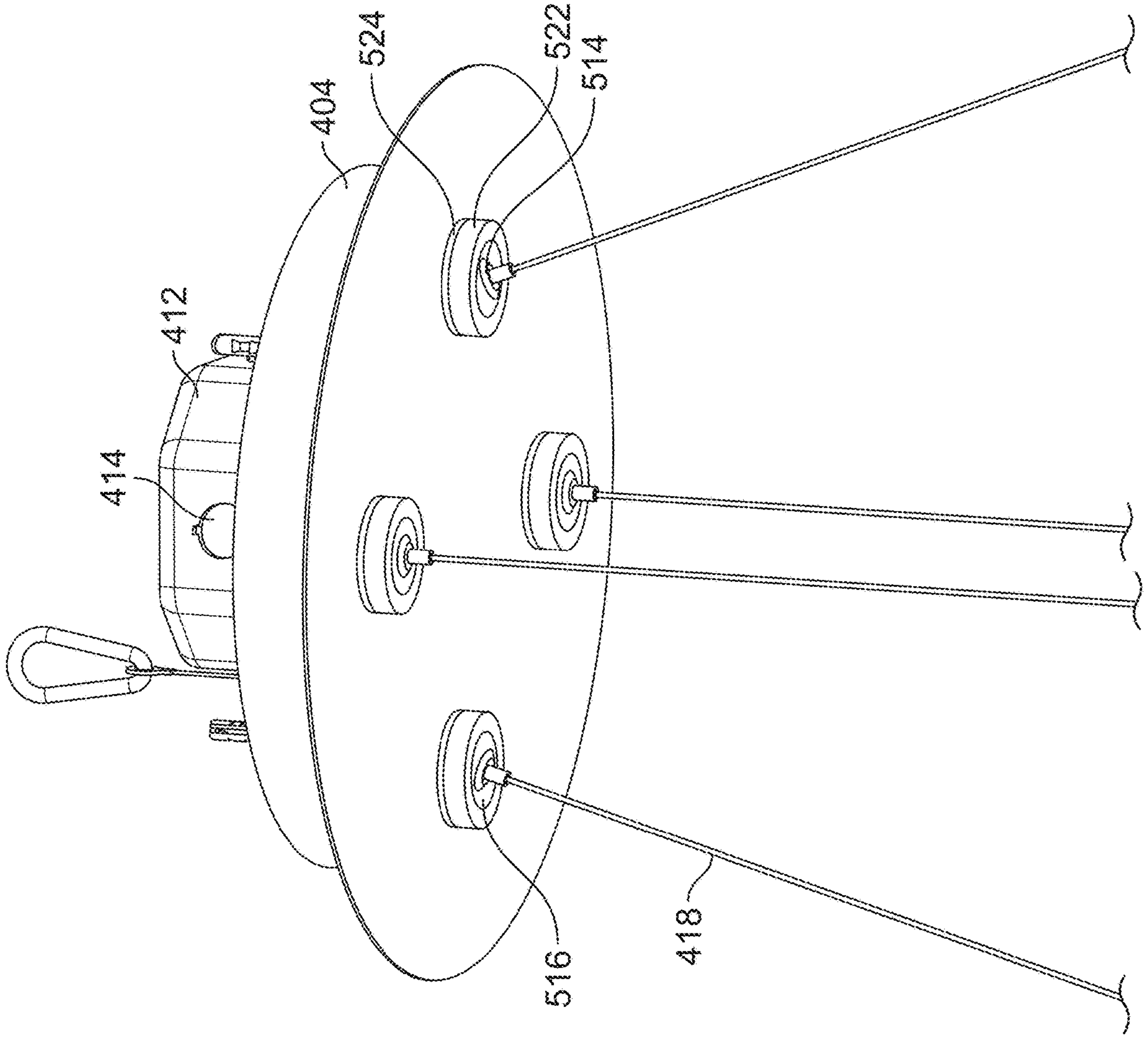
FIG. 6 shows illustrative apparatus in accordance with principles of the invention.

FIG. 6 shows a different view of illustrative fixture base 102.

Figure 7:
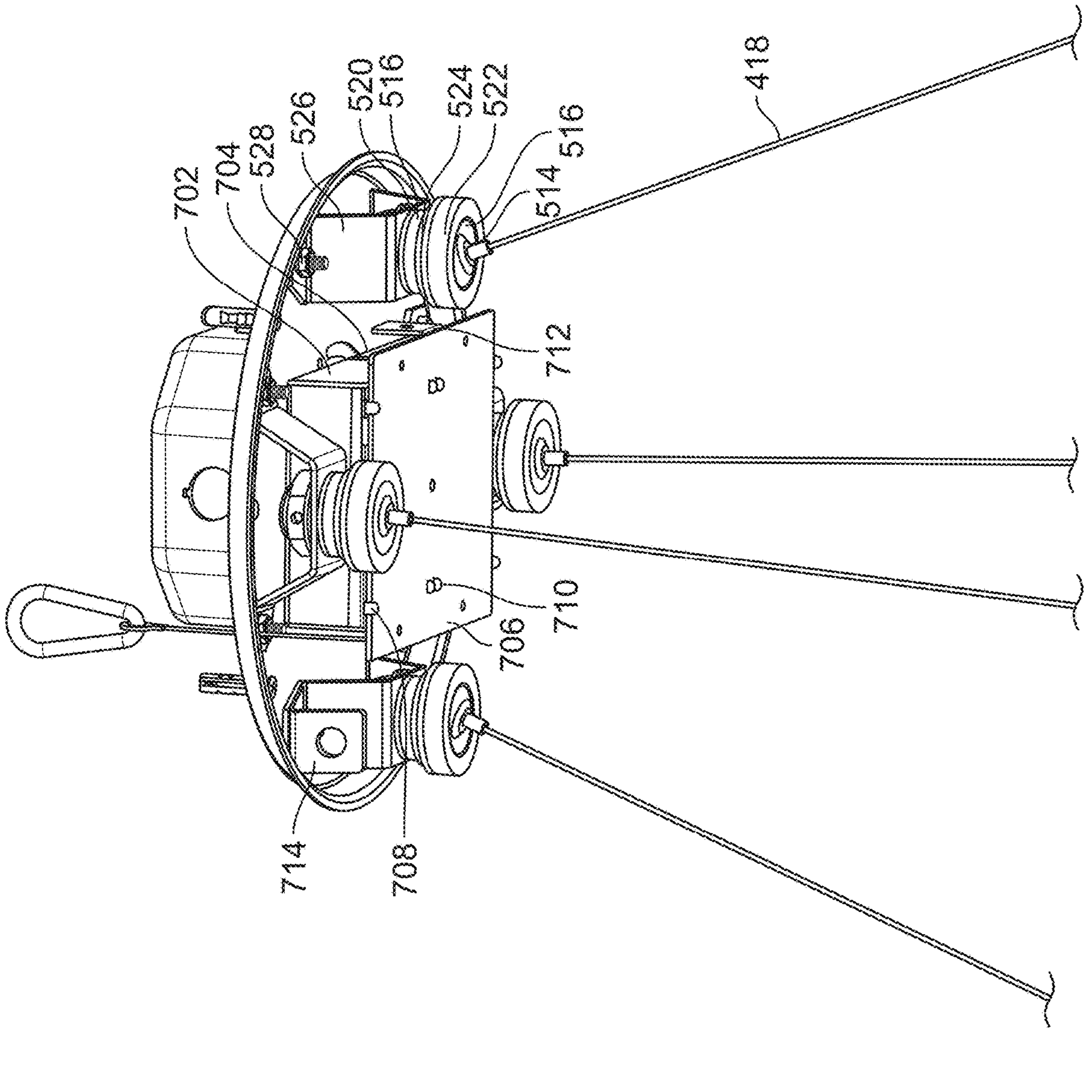
FIG. 7 shows illustrative apparatus in accordance with principles of the invention.

FIG. 7 shows a partial different view of illustrative fixture base 102. Driver 544 may be secured in enclosure 702 or enclosure 704. Enclosure plate 706 may be disposed on a bottom of enclosures 702 and 704. Enclosure 702 may include one or more tabs 708. Tabs 708 may fit into slots in enclosure plate 706 to secure enclosure 702 to enclosure plate 706. Enclosure 704 may include one or more tabs 710. Tabs 710 may fit into slots in enclosure plate 706 to secure enclosure 704 to enclosure plate 706. Enclosure plate 706 may include one or more tabs 712. Safety cord 416 may be secured to tab 712. Mounting bracket 714 may be mounted to bracket 526 via nut and bolt 528. Wire rope 418 may be locked to mounting bracket 714. The number of mounting brackets 714 may correspond to the number of wire ropes 418.

Figure 8:
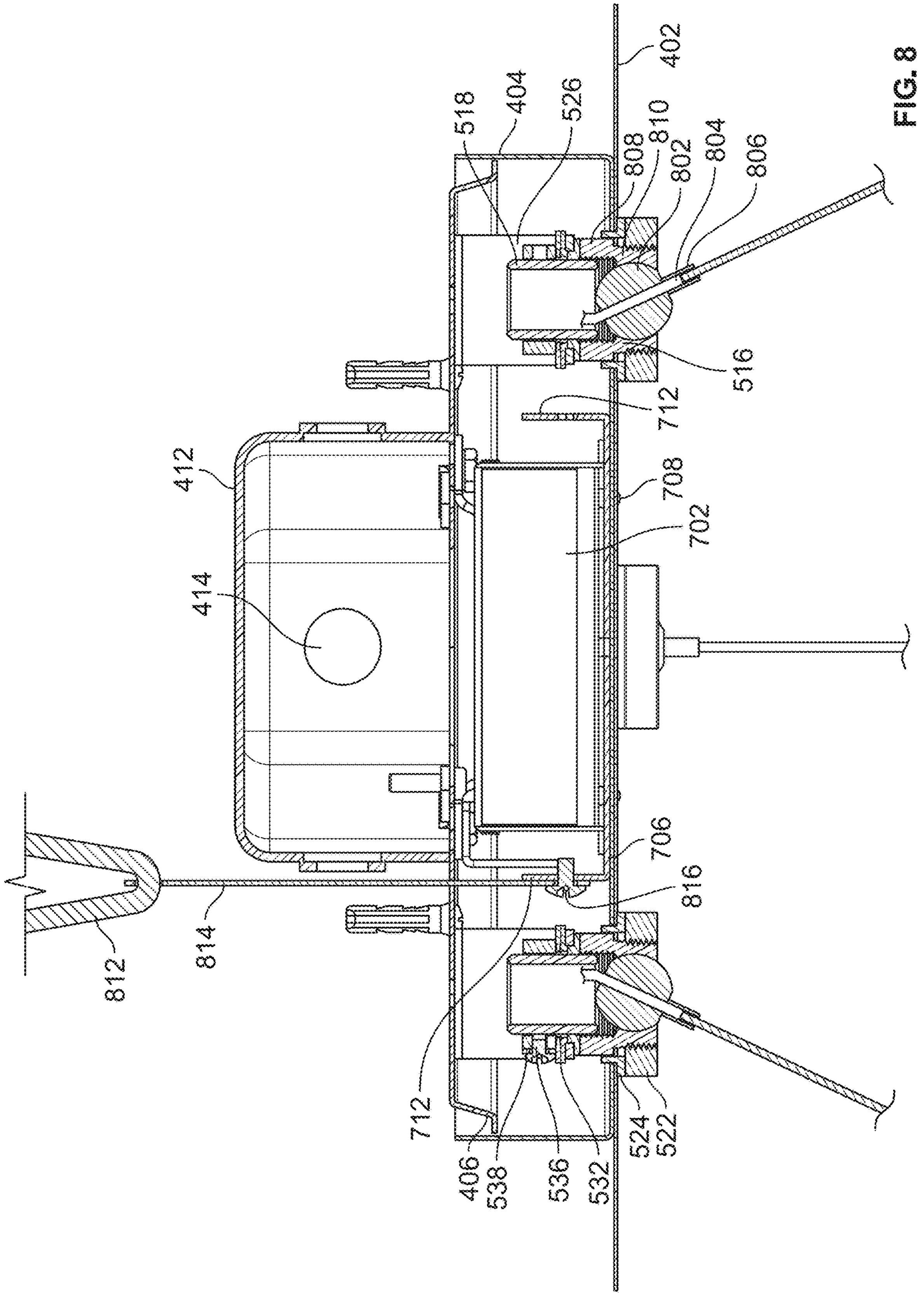
FIG. 8 shows a partial cross section of illustrative apparatus in accordance with principles of the invention.

FIG. 8 shows a partial cross-sectional view of illustrative fixture base 102. Adjustment swivel 514 may include swivel 802, central bore 804 and extension 806.

Wire rope 418 may be attached to extension 806. Wire rope 418 may be welded to extension 806. Extension 806 and swivel 802 may support the weight of wire ropes 418 and lighting assembly 104.

Wire rope 418 may be led through extension 806, central bore 804 and inner cylinder 518. Each wire rope 418 may be locked in place by a corresponding one of mounting brackets 714. Mounting brackets 714 may support the weight of wire ropes 418 and lighting assembly 104. Wire ropes 418 may be height-adjustable by feeding wire ropes 418 through a hole in mounting bracket and tying the wire ropes 418 through the hole to lock the wire ropes 418 in place. Once tied, free ends of wire ropes 418 may connect to lead wires 540 and 542 respectively. The free ends of wire ropes 418 may directly connect to lead wires 540 and 542 via a wire cap. The free ends of wire ropes 418 may electrically connect to lead wires 540 and 542 by engaging the free ends of wire ropes 418 with respective screws 536 and by securing ring terminal 538 to screw 536.

Swivel receptacle 516 may include top ring-shaped section 808 and bottom ring-shaped section 810. Top ring-shaped section 808 may include a larger outer diameter. Top ring-shaped section 808 may include internal threads. The internal threads may engage a lower portion of inner cylinder 518. Bottom ring-shaped section 810 may include a smaller outer diameter. Bottom ring-shaped section 810 may include external threads. An outer diameter of bottom ring-shaped section 810 may be larger than an inner diameter of top ring-shaped section 808. The shape of an inner portion of bottom ring-shaped section 810 may correspond to an external shape of swivel 802 to allow swivel 802 to swivel. Nut 522 may engage the external threads of bottom ring-shaped section 810.

Inner cylinder 518 may be threadingly engaged with swivel receptacle 516. Inner cylinder 518 may be threadingly lowered to lock swivel 802 and prevent swivel 802 from swiveling. Inner cylinder 518 may be threadingly lifted to unlock swivel 802 and enable swivel 802 to swivel.

Swivel 802 may swivel in response to an adjustment of the height of wire ropes 418. Swivel 802 may swivel to adjust an angle at which wire ropes 418 are supporting lighting assembly 104.

Safety cord 416 may include clip 812, cord 814 and screw 816. Clip 812 may be secured to the safety structure. Screw 816 may secure cord 814 to enclosure plate 706. Enclosure plate 706 may be secured to canopy 404 via screws or any other suitable fasteners.

Figure 9:
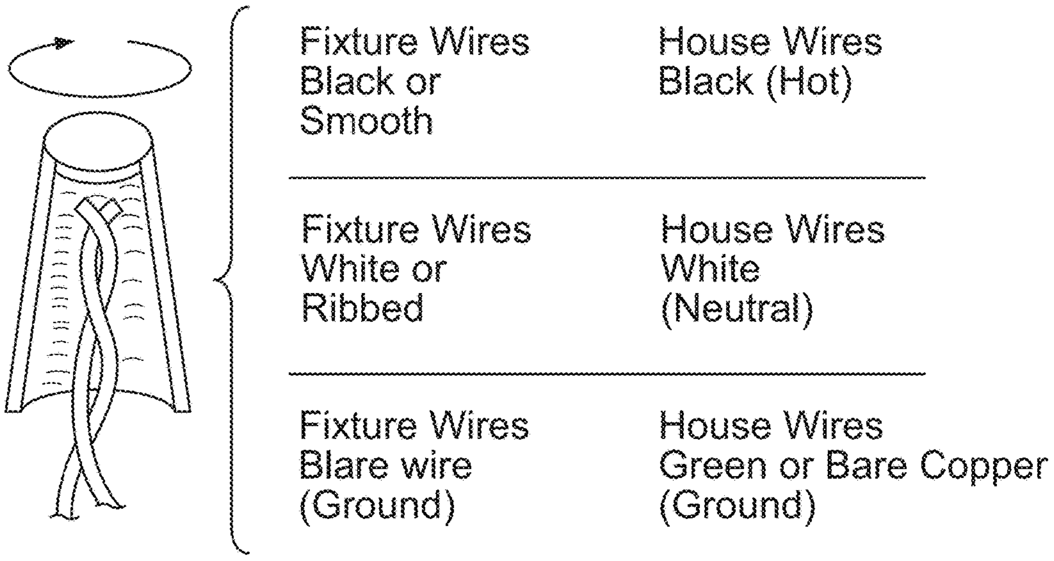
FIG. 9 shows illustrative apparatus in accordance with principles of the invention.

FIG. 9 shows illustrative wiring configurations for a fixture.

Figure 10:
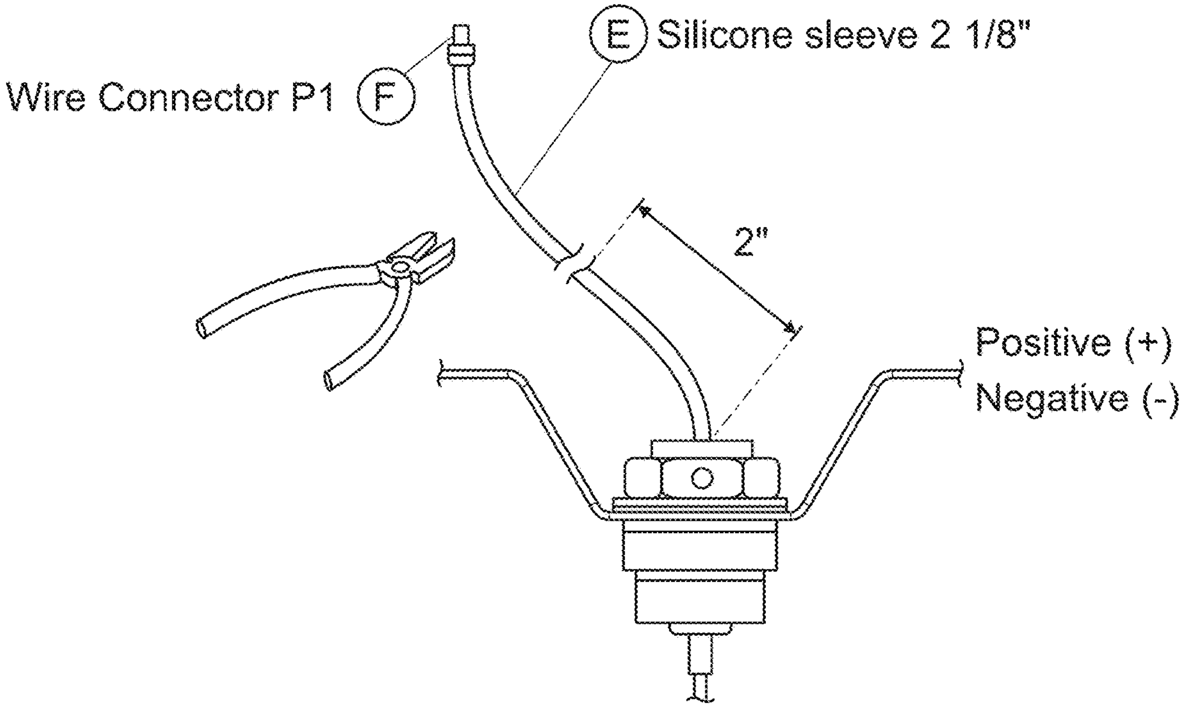
FIG. 10 shows illustrative apparatus in accordance with principles of the invention.

FIG. 10 shows illustrative wiring configurations for a fixture.

Figure 11:
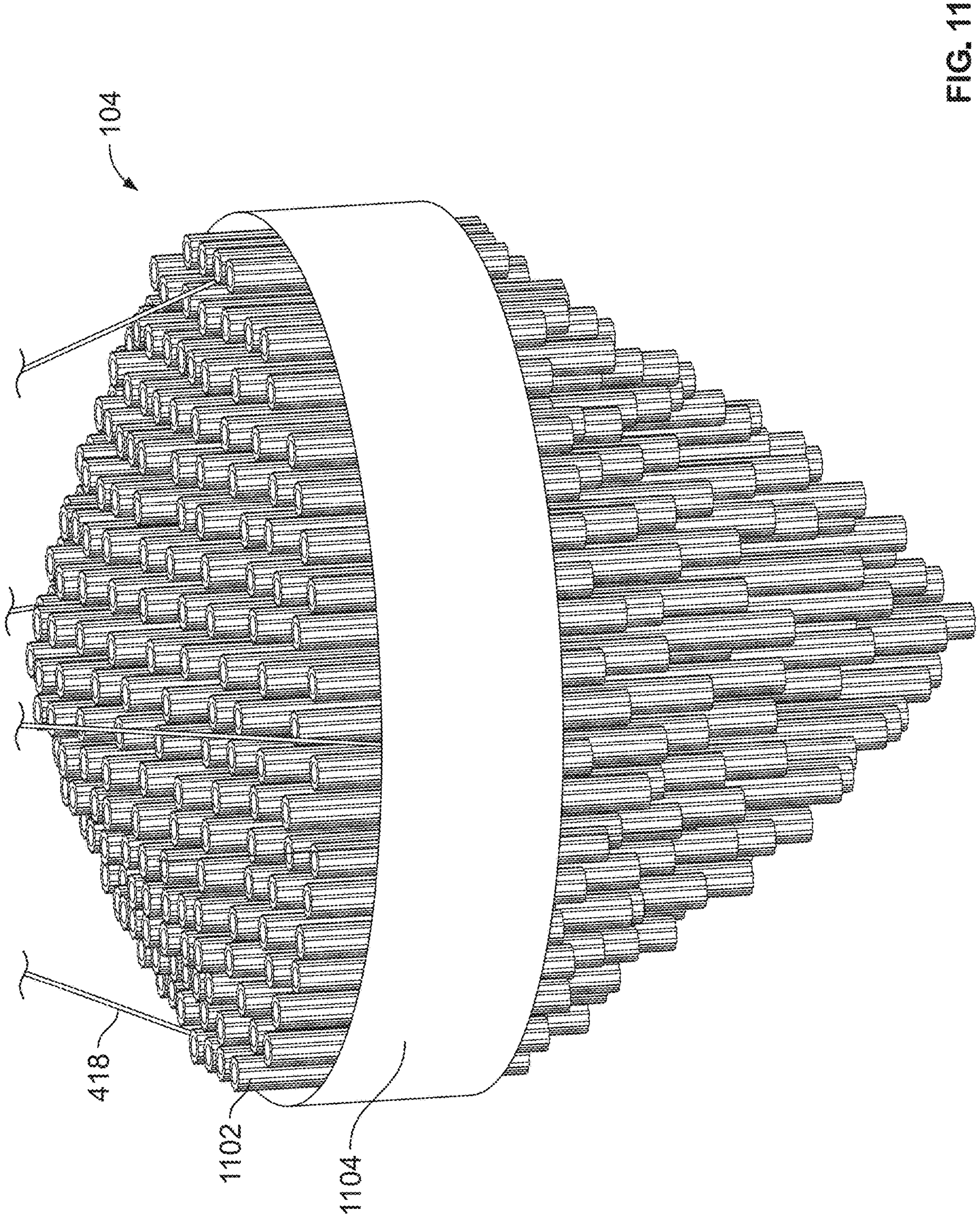
FIG. 11 shows illustrative apparatus in accordance with principles of the invention.

FIG. 11 shows illustrative lighting assembly 104. Lighting assembly 104 may include one or more of translucent body 1102 and belt 1104. Lighting assembly 104 may be supported by wire ropes 418. Belt 1104 may surround translucent bodies 1102.

Figure 12:
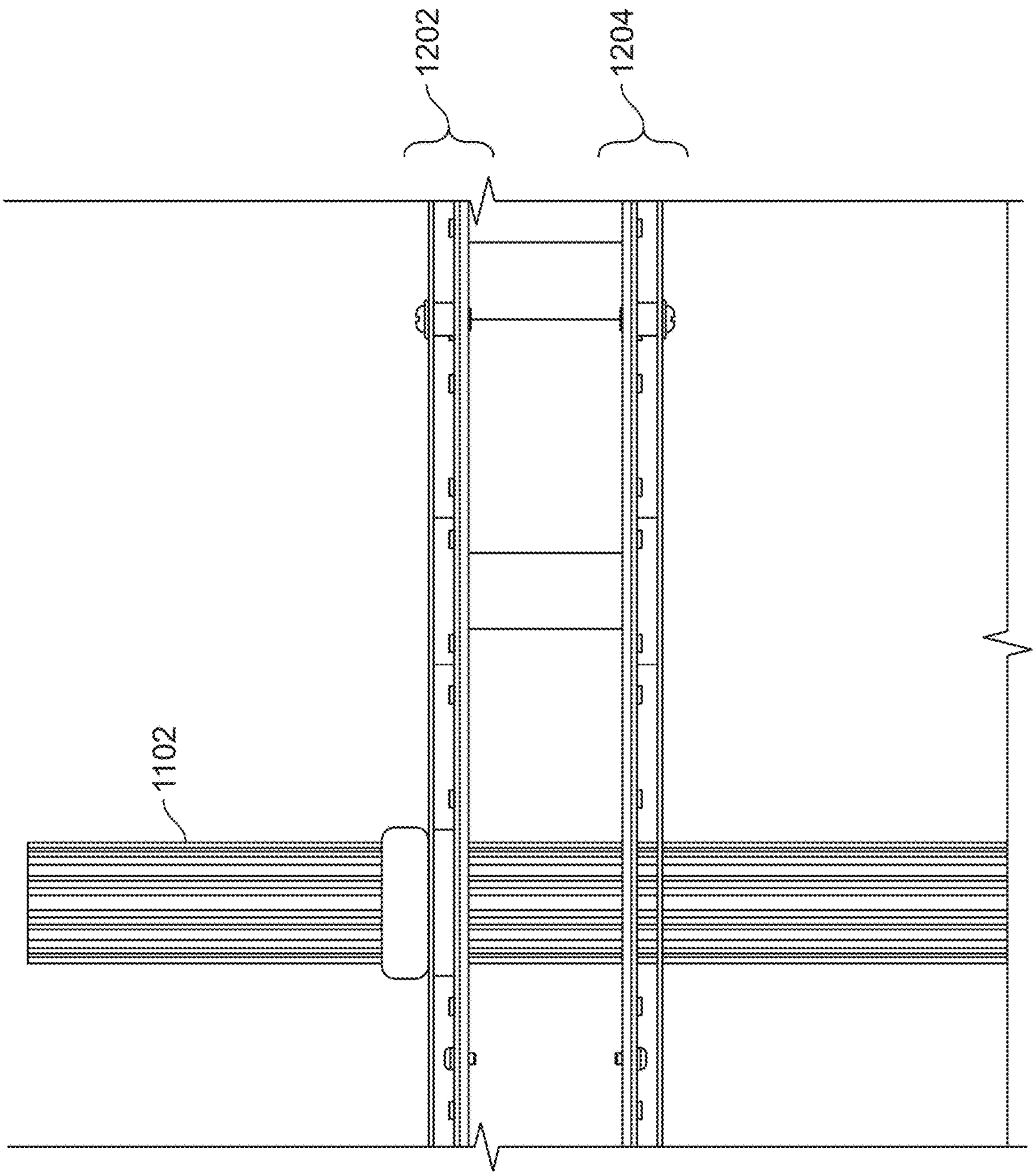
FIG. 12 shows illustrative apparatus in accordance with principles of the invention.

FIG. 12 shows a side view of illustrative lighting assembly 104 with some translucent bodies 1102 and belt 1104 removed. Lighting assembly 104 may include upper tier 1202 and lower tier 1204. Upper tier 1202 may include top and bottom plates. Lower tier 1204 may include top and bottom plates.

Figure 13:
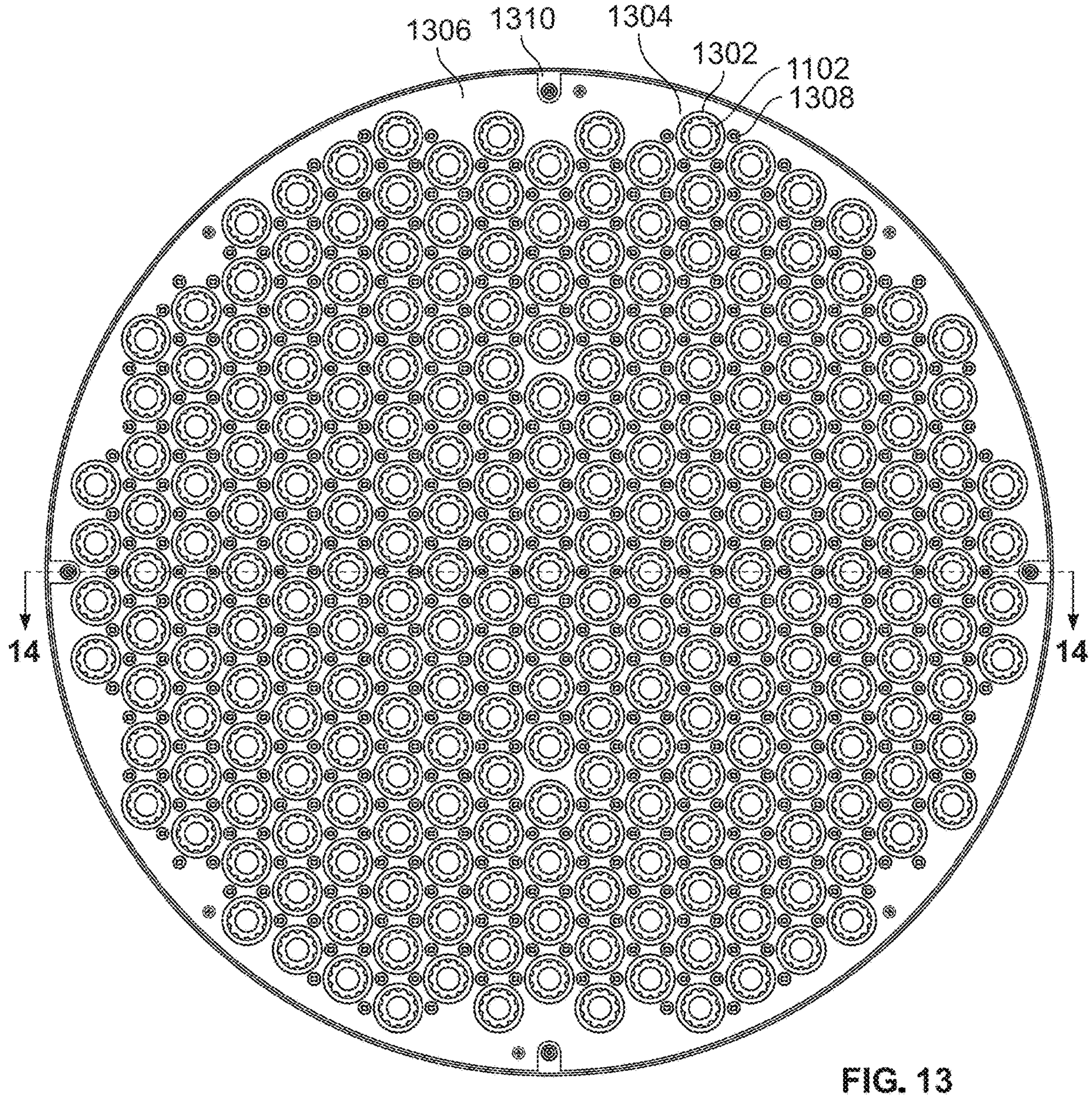
FIG. 13 shows illustrative apparatus in accordance with principles of the invention.

FIG. 13 shows a top view of illustrative lighting assembly 104. Lighting assembly 104 may include one or more of translucent body 1102, protrusion 1302, upper tier top plate body hole 1304, upper tier top plate 1306, upper tier top plate LED hole 1308 and upper tier top plate cutout 1310.

Upper tier top plate 1306 may support the translucent bodies 1102. Upper tier top plate 1306 may define upper tier top plate body holes 1304. The number of upper tier top plate body holes 1304 may correspond to the number of translucent bodies 1102. Translucent bodies 1102 may be inserted into upper tier top plate body holes 1304. Each translucent body 1102 may include a protrusion 1302. Upper tier top plate body holes 1304 may be sized to obstruct protrusions 1302 from entering upper tier top plate body holes 1304. Upper tier top plate 1306 may support translucent bodies 1102, e.g., against gravity, only by interference between translucent bodies 1102 and upper tier top plate 1306.

Upper tier top plate 1306 may be secured to belt 1104. Upper tier top plate 1306 may be welded to belt 1104.

Figure 14:
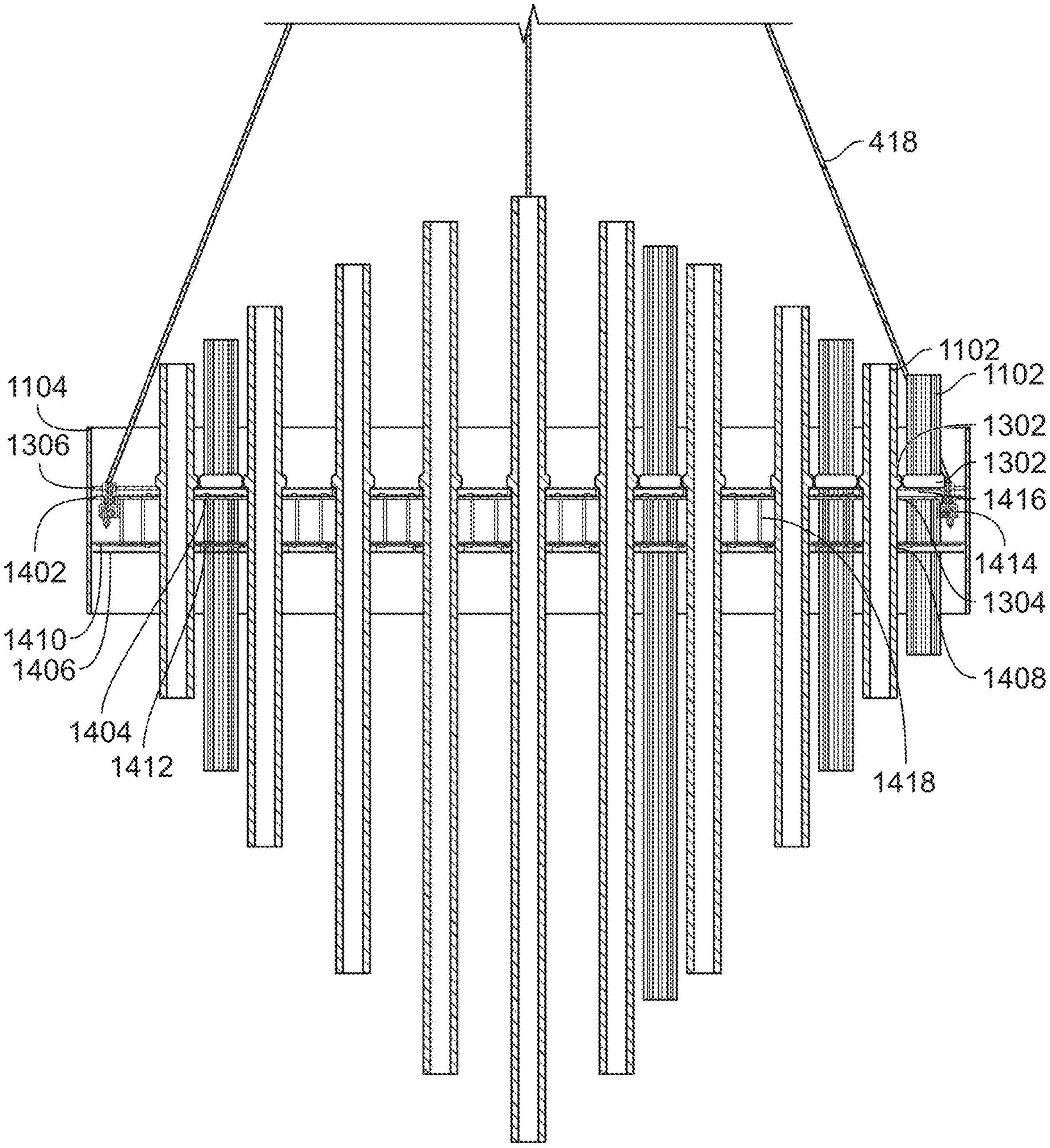
FIG. 14 is a cross-section of illustrative apparatus in accordance with principles of the invention, corresponding to the view taken along lines 14-14 in FIG. 13.

FIG. 14 shows a partial cross-sectional view of FIG. 13, with some of translucent bodies 1102 and belt 1104 removed. Lighting assembly 104 may include one or more of upper bottom plate 1402, upper LED 1404, lower bottom plate 1406, lower bottom plate body holes 1408, lower tier top plate 1410, lower LED 1412, plate support 1414, spacer rings 1416 and spacer risers 1418.

Upper bottom plate 1402 may support one or more upper LEDs 1404. Upper LED 1404 may emit light through upper tier top plate LED hole 1308. Upper tier top plate LEDs may emit light in an upward direction. Upper tier top plate LED hole 1308 may direct the light emitted from upper LED 1404. Upper bottom plate 1402 may be secured to belt 1104. Upper bottom plate 1402 may be welded to belt 1104.

Lower bottom plate 1406 may stabilize translucent bodies 1102. Lower bottom plate 1406 may prevent translucent bodies 1102 from tilting. Lower bottom plate 1406 may include lower bottom plate body holes 1408. Translucent bodies 1102 may be inserted into corresponding lower bottom plate body holes 1408. Lower bottom plate 1406 may be secured to belt 1104. Lower bottom plate 1406 may be welded to belt 1104.

Lower tier top plate 1410 may support one or more lower LEDs 1412. Lower LEDs 1412 may emit light in a downward direction.

Plate support 1414 may support upper tier top plate 1306. A corresponding wire rope 418 may support plate support 1414. The number of plate supports 1414 may correspond to the number of wire ropes 418. Wire rope 418 may be secured to plate support 1414. Plate support 1414 may fit within upper tier top plate cutout 1310. Plate support 1414 may be secured to upper bottom plate 1402.

Spacer rings 1416 may be disposed between upper tier top plate 1306 and upper bottom plate 1402. Spacer rings 1416 may provide a uniform distance between upper tier top plate 1306 and upper bottom plate 1402. Spacer rings 1416 may prevent upper tier top plate 1306 from sagging under the weight of translucent bodies 1102. It may be desirable for the distance between upper tier top plate 1306 and upper bottom plate 1402 to remain uniform in some or all of lighting assembly 104. This may provide for upper tier top plate LED hole 1308 to emit light in a desired direction. It may be desirable for the distance between upper tier top plate 1306 and upper bottom plate 1402 to remain uniform in some or all of lighting assembly 104. This may provide for translucent bodies 1102 to be aligned and properly angled to produce a desired lighting effect.

Spacer risers 1418 may be disposed between upper bottom plate 1402 and lower tier top plate 1410. Spacer risers 1418 may provide a uniform distance between upper bottom plate 1402 and lower tier top plate 1410 in some or all of lighting assembly 104. Spacer risers 1418 may prevent upper bottom plate 1402 from sagging under the weight of translucent bodies 1102. Sagging may cause lower bottom plate body holes 1408 and upper tier top plate body holes 1304 to be misaligned. Sagging may cause translucent bodies to be tilted with respect to one another.

Figure 15:
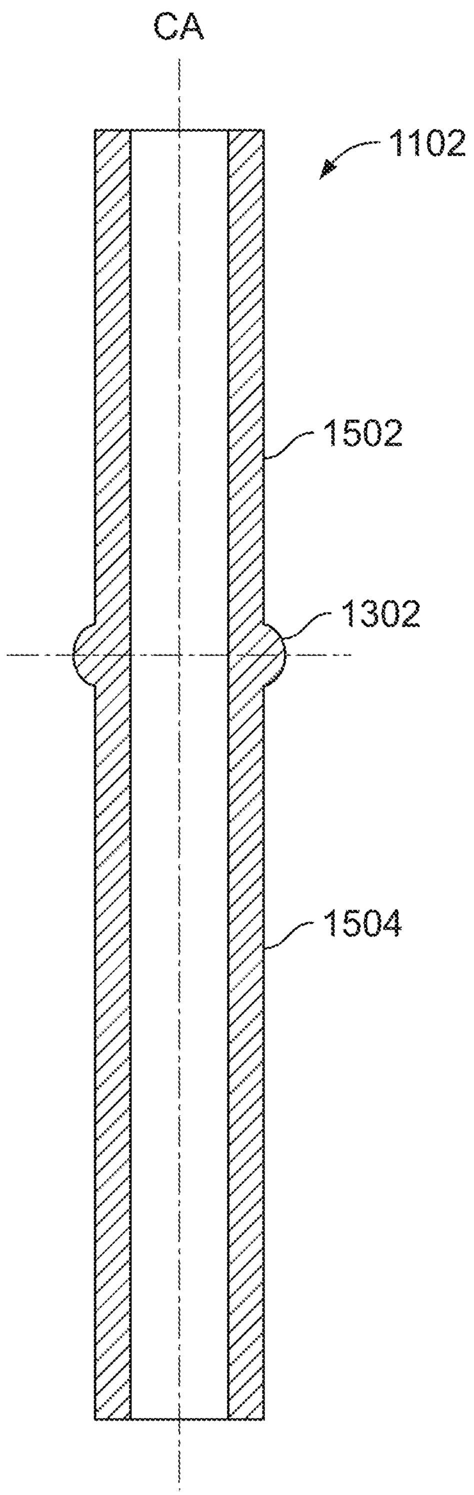
FIG. 15 is a partial cross-section of illustrative apparatus in accordance with principles of the invention, corresponding to the view taken along lines 15-15 in FIG. 16.
Figure 16:
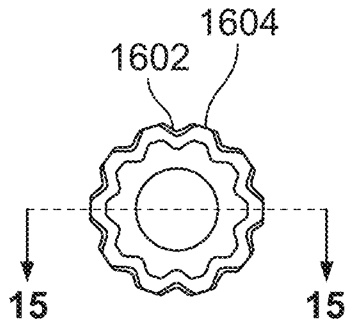
FIG. 16 shows illustrative apparatus in accordance with principles of the invention.

FIG. 15 shows a cross-sectional view of translucent body 1102 taken along lines 15-15 in FIG. 16. Translucent body 1102 may include protrusion 1302, upper extension 1502 and lower extension 1504. Upper extension 1502, protrusion 1302 and lower extension 1504 may be monolithic. Upper extension 1502, protrusion 1302 and lower extension 1504 may share a common central axis CA.

The length of upper extension 1502 may be longer, shorter or equal than a length of lower extension 1504. Upper extension 1502 may include an outer diameter. Upper extension 1502 may include an inner diameter. Lower extension 1504 may include an outer diameter. Lower extension 1504 may include an inner diameter. The outer diameter of upper extension 1502 may be greater than, less than or equal to the outer diameter of lower extension 1504. The inner diameter of upper extension 1502 may be greater than, less than or equal to the inner diameter of lower extension 1504.

Translucent body 1102 may be made from a material that may be shaped when heated. The material may be glass, plastic or any other suitable translucent material.

FIG. 16 shows a top view of translucent body 1102. Translucent body 1102 may be fluted. Translucent body 1102 may include one or more of grooves 1602 and ridges 1604. One groove 1602 or set of grooves 1602 may form a fluting. Translucent body 1102 may include multiple flutings. Grooves 1602 may be sized and shaped to disperse light entering it in a desired manner. The number of grooves 1602 may correspond to the number of ridges 1604. The number of grooves 1602 may be selected to reflect light in a desired manner. There may be 4, 5, 6, 7, 8, 9, 10, 11, 12 or any suitable number of grooves 1602. Grooves 1602 and ridges 1604 may end before reaching protrusion 1302. Grooves 1602 and ridges 1604 on upper extension 1502 may correspond to grooves 1602 and ridges 1604 on lower extension 1504. Grooves 1602 and ridges 1604 on upper extension 1502 may include patterns, numbers or sizes that are the same as, or different from, those on lower extension 1504.

Figure 17:
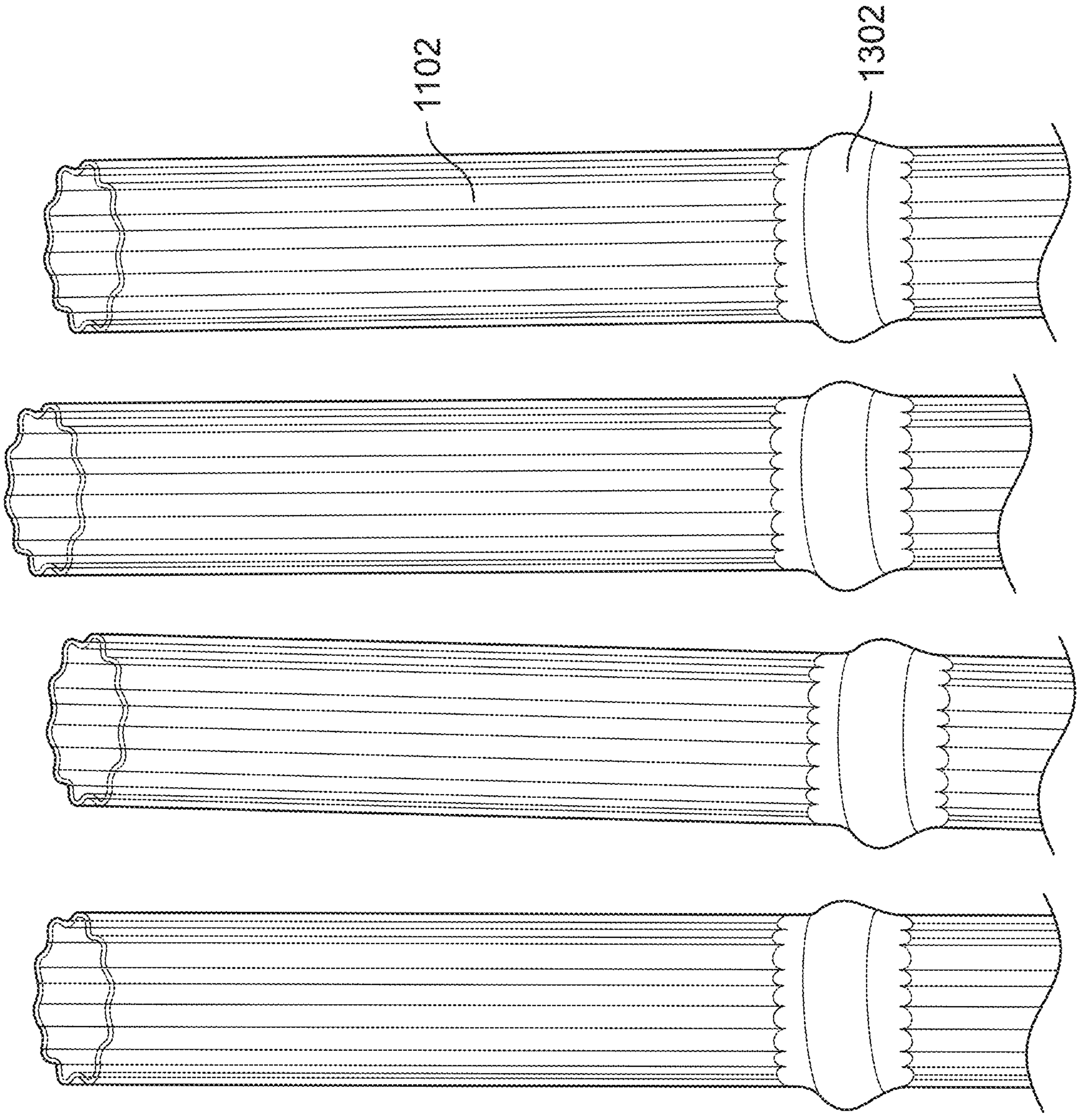
FIG. 17 shows illustrative apparatus in accordance with principles of the invention.

FIG. 17 shows a plurality of translucent bodies 1102.

Figure 18:
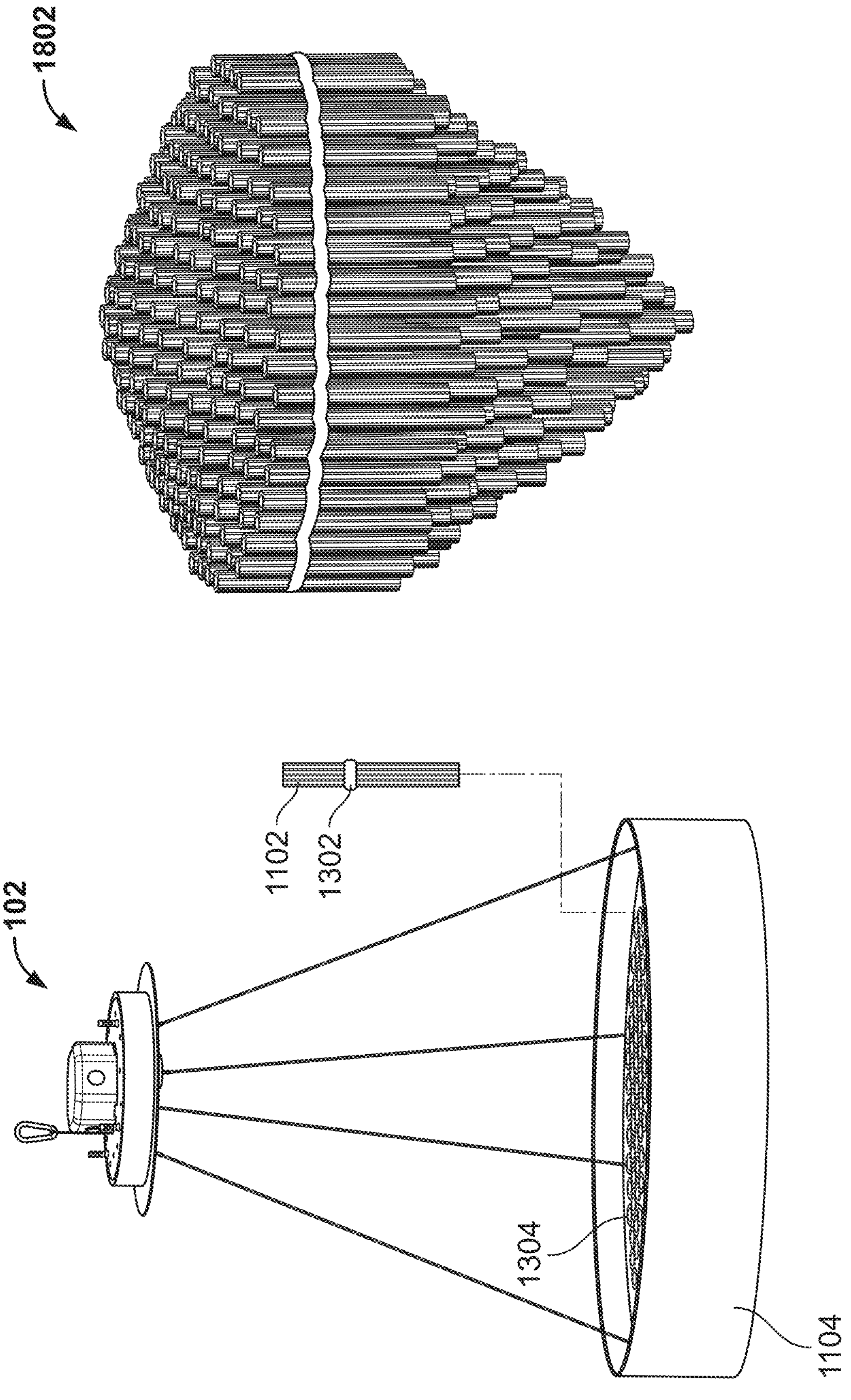
FIG. 18 shows illustrative apparatus in accordance with principles of the invention.

FIG. 18 shows an exploded view of fixture 100. Fixture 100 may include translucent body bundle 1802. Translucent body bundle 1802 may include a plurality of different sized translucent bodies 1102. Translucent bodies 1102 may be arranged such that light is emitted in a desired manner. Translucent bodies 1102 may be inserted into upper tier top plate body holes 1304. There may be a clearance between the outer diameter of translucent bodies 1102 and upper tier top plate body holes 1304. The clearance may be zero or negligible. The clearance may be 1, 2, 3, 4, 5 or any suitable number of millimeters.

Figure 19:
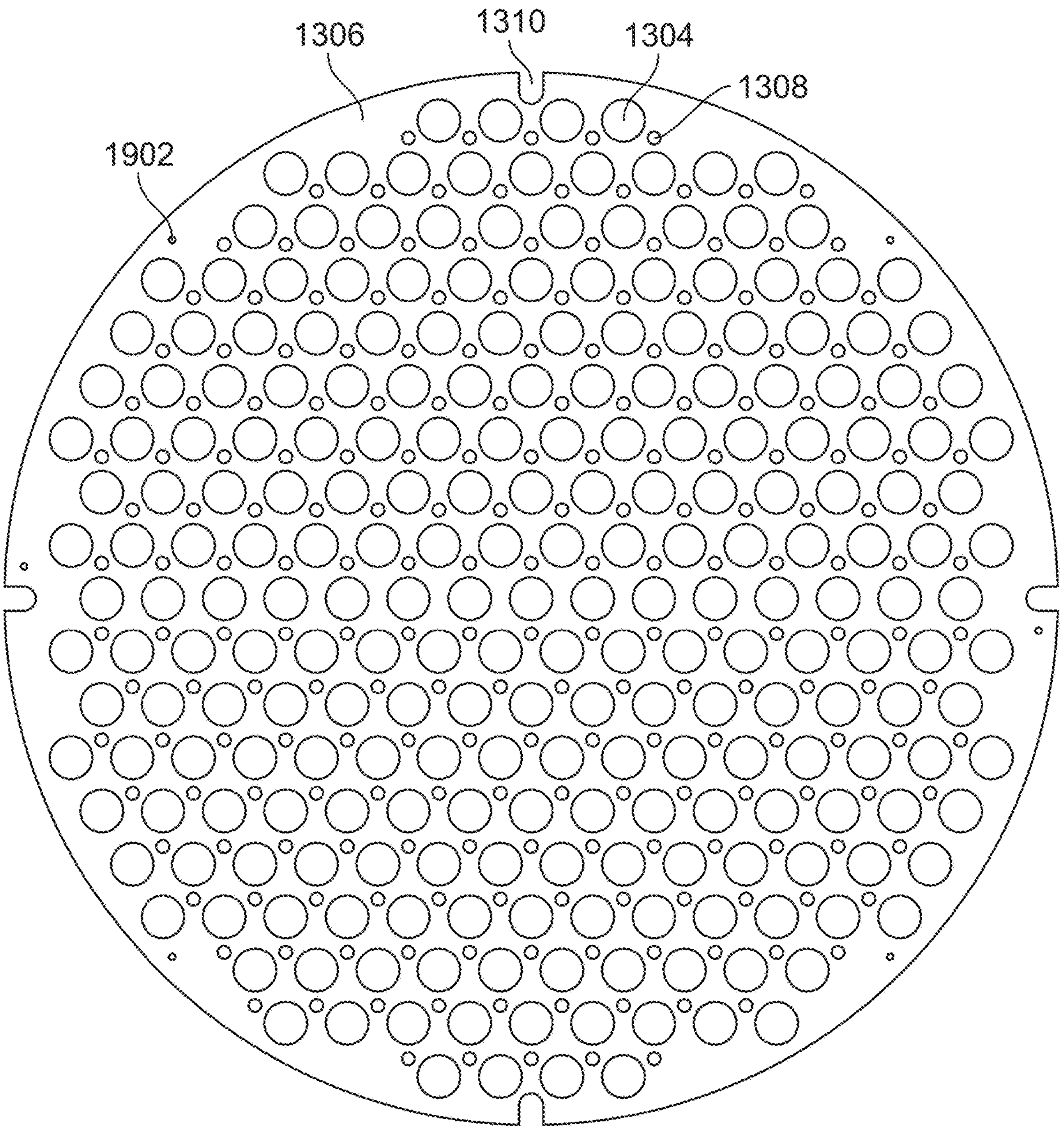
FIG. 19 shows illustrative apparatus in accordance with principles of the invention.

FIG. 19 shows a top view of upper tier top plate 1306.

Upper tier top plate 1306 may include upper tier top plate screw holes 1902.

Figure 20:
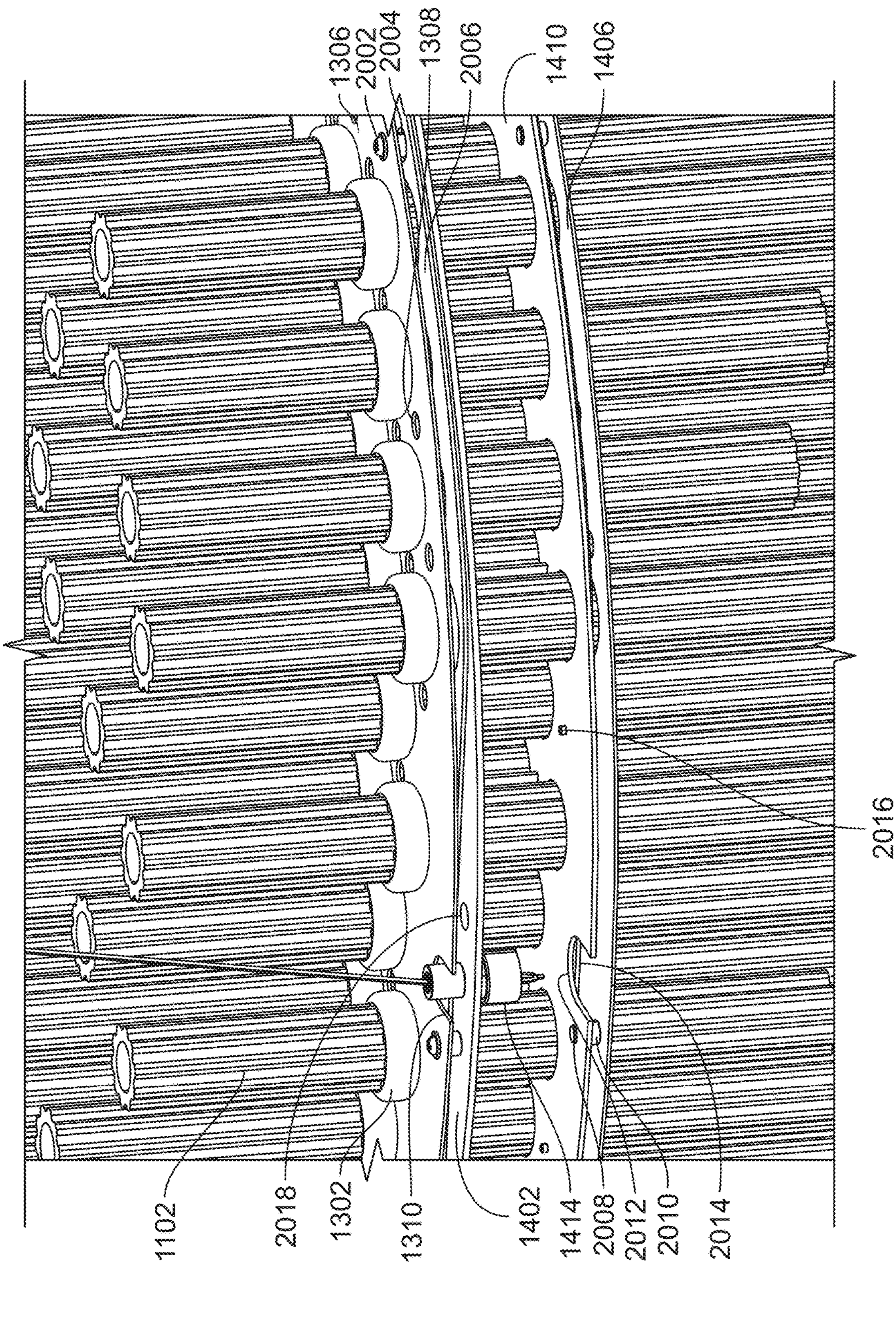
FIG. 20 shows illustrative apparatus in accordance with principles of the invention.

FIG. 20 shows a partial view of illustrative lighting assembly 104 with belt 1104 removed.

Lighting assembly 104 may include one or more of upper plate screws 2002, upper plate spacers 2004, upper circuit board 2006, lower plate screws 2008, lower plate spacers 2010, lower tier top plate cutout 2012, lower circuit board 2014, lower circuit board screw 2016 and wiring holes 2018.

Upper plate screws 2002 may be inserted through upper tier top plate screw holes 1902. Upper plate screws 2002 may screw into upper plate spacers 2004. Upper plate screws 2002 may secure upper tier top plate 1306 to upper bottom plate 1402. Upper plate spacers 2004 may provide a uniform distance between upper tier top plate 1306 and upper bottom plate 1402 in some or all of lighting assembly 104. Upper plate spacers 2004 may be integral with upper bottom plate 1402. Upper plate spacers 2004 may be connected to upper bottom plate 1402. Upper plate screws 2002 and upper plate spacers 2004 may be used to align upper tier top plate 1306 with upper bottom plate 1402.

Upper bottom plate 1402 may support upper circuit board 2006. Upper circuit board 2006 may be fastened to upper bottom plate 1402. Upper LEDs 1404 may be attached to upper circuit board 2006. Upper circuit board 2006 may control upper LEDs 1404. Upper circuit board 2006 may extend across upper bottom plate 1402. Upper LEDs 1404 may be disposed between adjacent translucent bodies 1102. Upper LEDs 1404 may be disposed in the center of three translucent bodies 1102. The three translucent bodies 1102 may form an equilateral triangle. The translucent bodies 1102 may be distributed such that each translucent body 1102 forms an apex of an equilateral triangle. Upper LEDs 1404 may be disposed in a pattern. The pattern may be arranged such that light is emitted in a desired manner.

Upper LEDs 1404 may be connected in parallel, in series or any combination of serial and parallel connections. Upper LEDs 1404 may include a first group of LEDs and a second group of LEDs. Upper LEDs 1404 may include 3, 4, 5, 6 or any suitable number of LED groups. The first group of LEDs may include a first correlated color temperature ("CCT"). The second group of LEDs may include a second CCT. The first CCT may be different from the second CCT. The first group of LEDs may be arranged in a pattern with respect to the second group of LEDs. The pattern may be arranged such that light is emitted in a desired manner. The first and second CCTs may be user selectable. Each group of LEDs may include 1, 2, 3, 4, 5 or any suitable number of different CCTs. Each group of LEDs may include 1, 2, 3, 4, 5 or any suitable number of different red, green and blue ("RGB"), warm white, cool white, and any other suitable colored LEDs. The different colored LEDs may be user selectable.

The different colored LEDs may include LEDs configured to emit violet light. The LEDs may include LEDs configured to emit indigo light. The LEDs may include LEDs configured to emit blue light. The LEDs may include LEDs configured to emit green light. The LEDs may include LEDs configured to emit yellow light. The LEDs may include LEDs configured to emit orange light. The LEDs may include LEDs configured to emit red light. The LEDs may include LEDs of different CCT. The different CCTs may include any CCTs in the range of 1800° K to 6500° K.

Upper LEDs 1404 may dissipate heat to upper bottom plate 1402 via thermal conduction. Upper bottom plate 1402 may dissipate heat to belt 1104 via thermal conduction. Upper bottom plate 1402 may dissipate heat to spacer risers 1418 via thermal conduction. Belt 1104 and spacer risers 1418 may dissipate heat to the environment via natural convection and radiation.

Lower plate screws 2008 may be inserted through lower bottom plate screw holes. Lower plate screws 2008 may screw into lower plate spacers 2010. Lower plate screws 2008 may secure lower bottom plate 1406 to lower tier top plate 1410. Lower plate spacers 2010 may enable that the distance between lower bottom plate 1406 and lower tier top plate 1410 remains uniform in some or all of lighting assembly 104. Lower plate spacers 2010 may be integral with lower tier top plate 1410. Lower plate spacers 2010 may be connected to lower tier top plate 1410. Lower plate screws 2008 and lower plate spacers 2010 may be used to align lower bottom plate 1406 with lower tier top plate 1410.

Lower tier top plate 1410 may support lower circuit board 2014. Lower circuit board 2014 may be fastened to lower tier top plate 1410. Lower LEDs 1412 may be attached to lower circuit board 2014. Lower circuit board 2014 may control lower LEDs 1412. Lower circuit board 2014 may extend across lower tier top plate 1410. Lower LEDs 1412 may be disposed between adjacent translucent bodies 1102. Lower LEDs 1412 may be disposed in the center of the three translucent bodies 1102. Lower LEDs 1412 may be disposed in a pattern. The pattern may be arranged such that light is emitted in a desired manner.

Lower LEDs 1412 may be connected in parallel, in series or any combination of serial and parallel connections. Lower LEDs 1412 may include a first group of LEDs and a second group of LEDs. Lower LEDs 1412 may include 3, 4, 5, 6 or any suitable number of LED groups. The first group of LEDs may include a first correlated color temperature ("CCT"). The second group of LEDs may include a second CCT. The first CCT may be different from the second CCT. The first group of LEDs may be arranged in a pattern with respect to the second group of LEDs. The pattern may be arranged such that light is emitted in a desired manner. The first and second CCTs may be user selectable. Each group of LEDs may include 1, 2, 3, 4, 5 or any suitable number of different CCTs. Each group of LEDs may include 1, 2, 3, 4, 5 or any suitable number of different red, green and blue ("RGB"), warm white, cool white, and any other suitable colored LEDs. The different colored LEDs may be user selectable.

The different colored LEDs may include LEDs configured to emit violet light. The LEDs may include LEDs configured to emit indigo light. The LEDs may include LEDs configured to emit blue light. The LEDs may include LEDs configured to emit green light. The LEDs may include LEDs configured to emit yellow light. The LEDs may include LEDs configured to emit orange light. The LEDs may include LEDs configured to emit red light. The LEDs may include LEDs of different CCT. The different CCTs may include any CCTs in the range of 1800° K to 6500° K.

Lower circuit board screw 2016 may secure lower circuit board 2014 to lower tier top plate 1410. Lower LEDs 1412 may dissipate heat to lower tier top plate 1410 via thermal conduction. Lower tier top plate 1410 may dissipate heat to belt 1104 via thermal conduction. Lower tier top plate 1410 may dissipate heat to spacer risers 1418 via thermal conduction.

Figure 21:
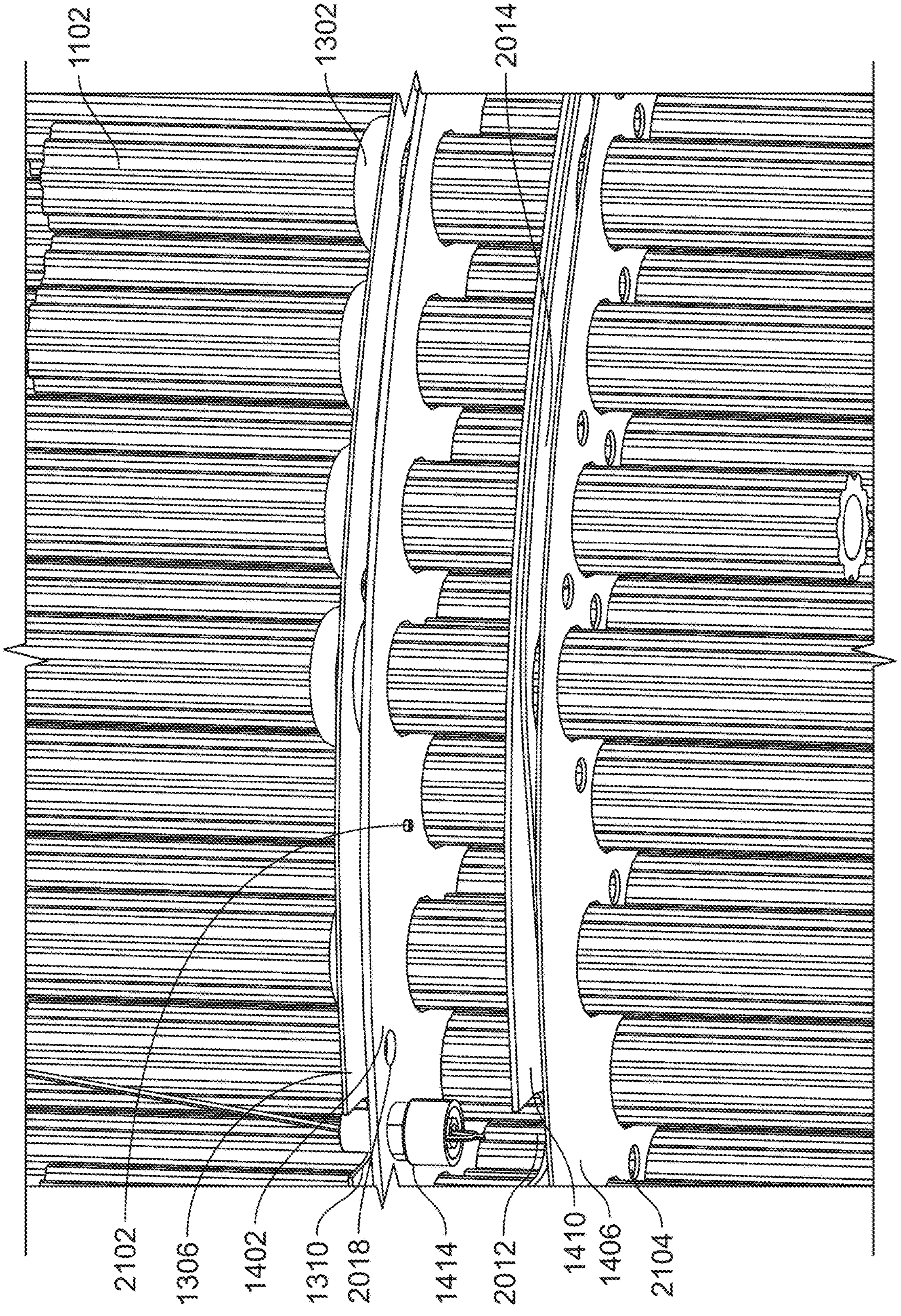
FIG. 21 shows illustrative apparatus in accordance with principles of the invention.

FIG. 21 shows a view of illustrative lighting assembly 104 with belt 1104 removed. Lighting assembly 104 may include one or more of upper circuit board screw 2102 and lower bottom plate LED hole 2104.

Upper circuit board screw 2102 may secure upper circuit board 2006 to upper bottom plate 1402.

Lower LED 1412 may emit light through lower bottom plate LED hole 2104. Lower bottom plate LED hole 2104 may direct the light emitted from lower LED 1412.

Figure 22:
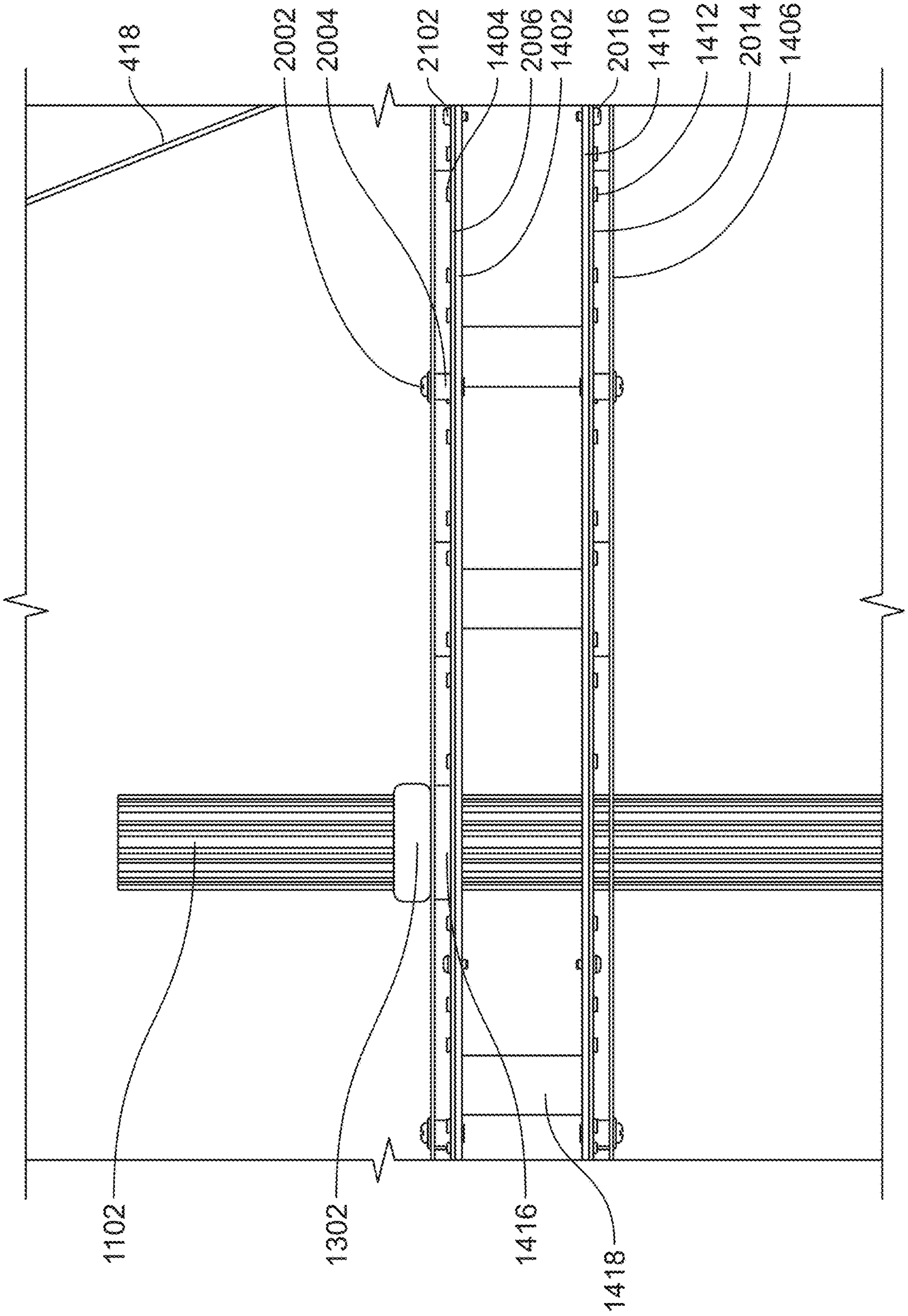
FIG. 22 shows illustrative apparatus in accordance with principles of the invention.

FIG. 22 shows a side view of illustrative lighting assembly 104 with some translucent bodies 1102 and belt 1104 removed.

Figure 23:
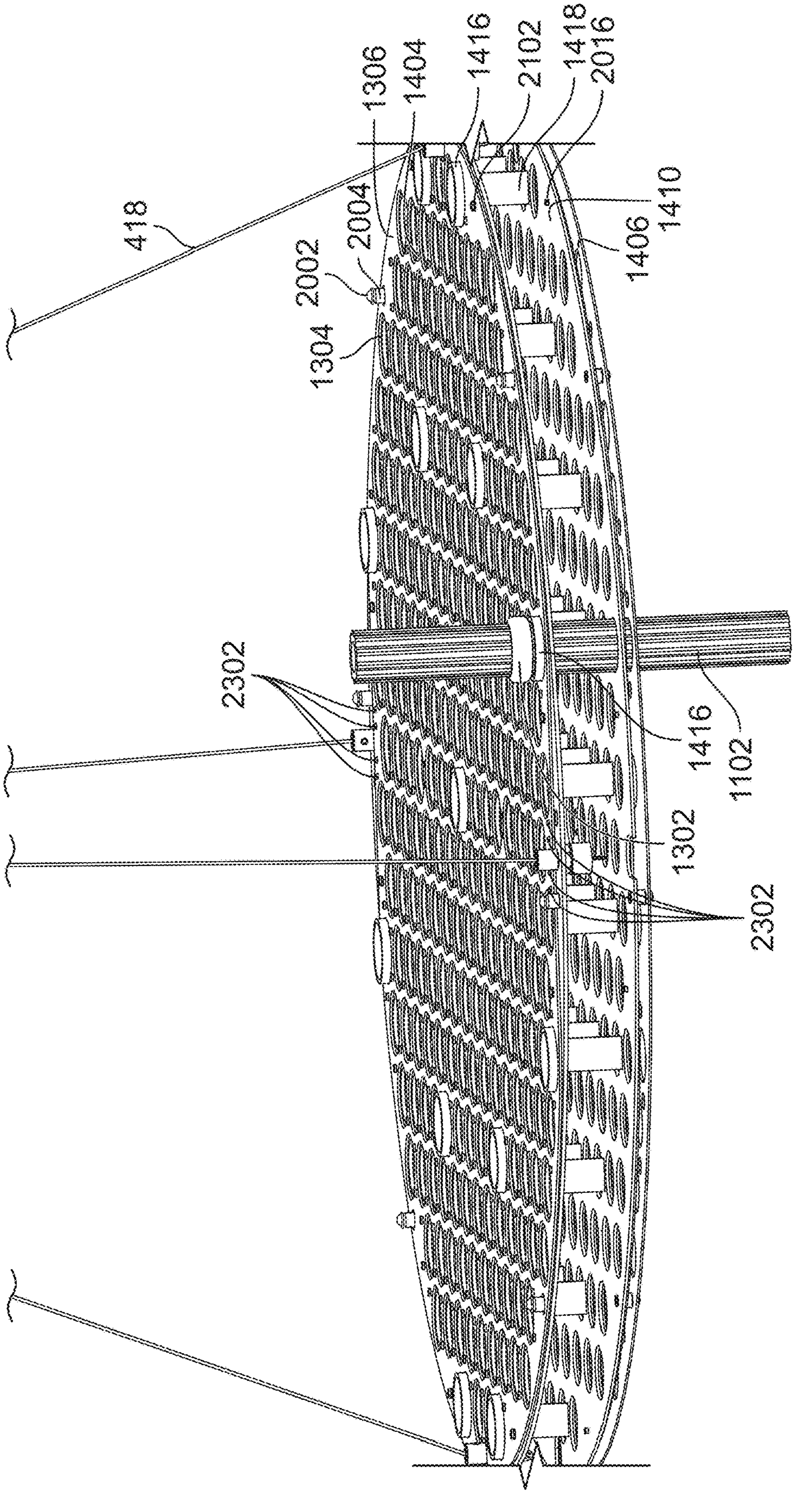
FIG. 23 shows illustrative apparatus in accordance with principles of the invention.

FIG. 23 shows a view of illustrative lighting assembly 104 with some translucent bodies 1102, belt 1104 and upper tier top plate 1306 removed.

A spacer ring 1416 may be inserted between each translucent body 1102 and upper tier top plate 1306. There may be fewer spacer rings 1416 than translucent bodies 1102. Spacer rings 1416 may be arranged in a pattern. The pattern and number of spacer rings 1416 may be selected such as to enable that a distance between upper tier top plate 1306 and upper bottom plate 1402 remains uniform in some or all of lighting assembly 104. Spacer rings 1416 may work in conjunction with upper plate spacers 2004. The pattern and number of spacer rings 1416 may depend on the size of one or more of translucent bodies 1102, lighting assembly 104 and upper tier top plate 1306. The pattern and number of spacer rings 1416 may depend on the weight of one or more of translucent bodies 1102 and lighting assembly 104.

Upper circuit board 2006 may include power connections 2302. Lower circuit board 2014 may include power connections 2402. Wire ropes 418 may connect to power connections 2302 and 2402 to supply power to upper circuit board 2006 and lower circuit board 2014 respectively. Power connections 2302 and 2402 may include a positive power terminal and a negative power terminal. The positive and negative power terminals may be on opposite sides of upper circuit board 2006 and lower circuit board 2014 respectively. The positive and negative power terminals may be in electrical communication with corresponding positive and negative conductors included in wire ropes 418. Upper circuit board 2006 may include two circuit boards. Lower circuit board 2014 may include two circuit boards.

Figure 24:
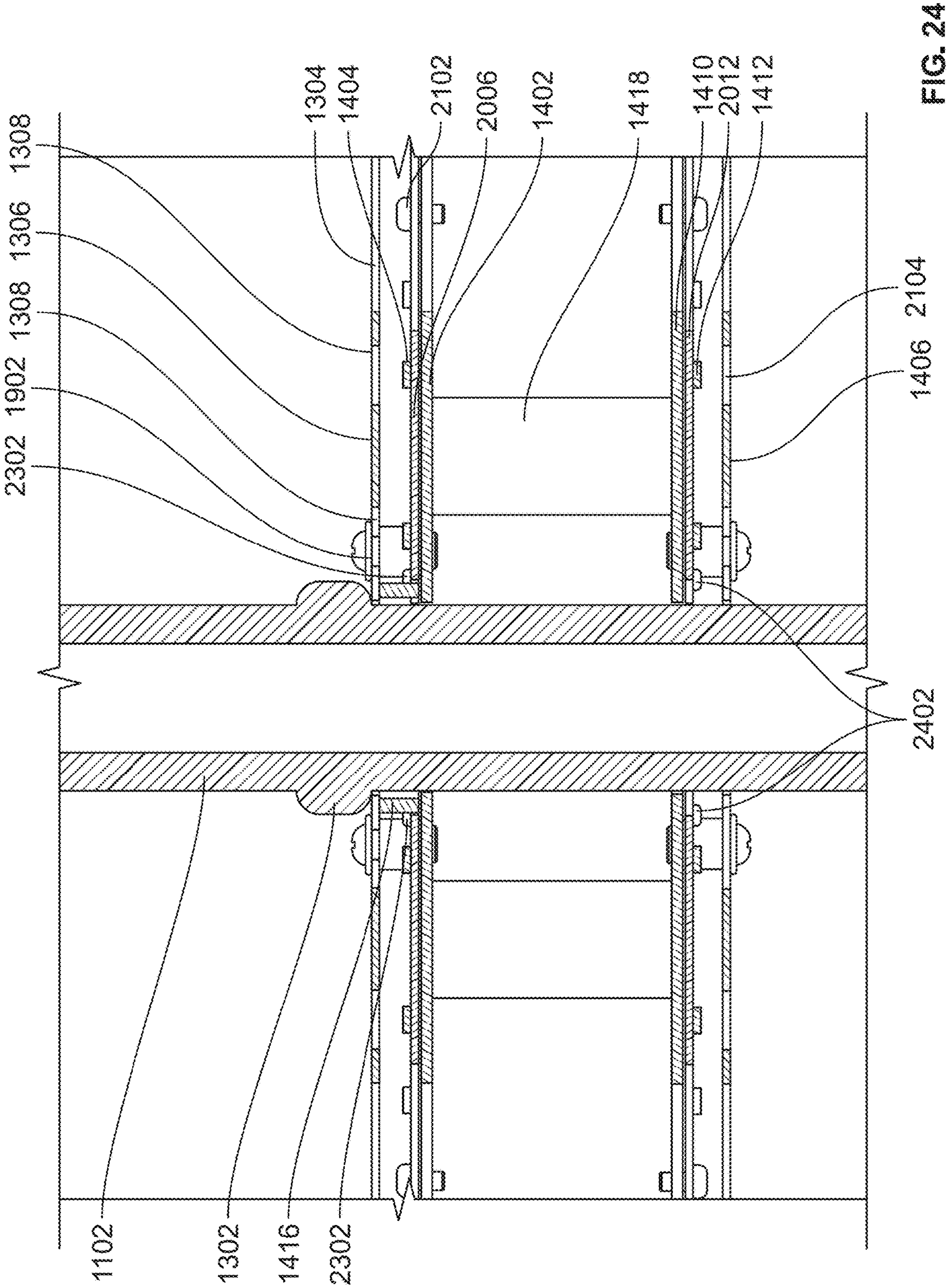
FIG. 24 shows illustrative apparatus in accordance with principles of the invention.

FIG. 24 shows a cross-sectional view of illustrative lighting assembly 104 with belt 1104 removed.

Figure 25:
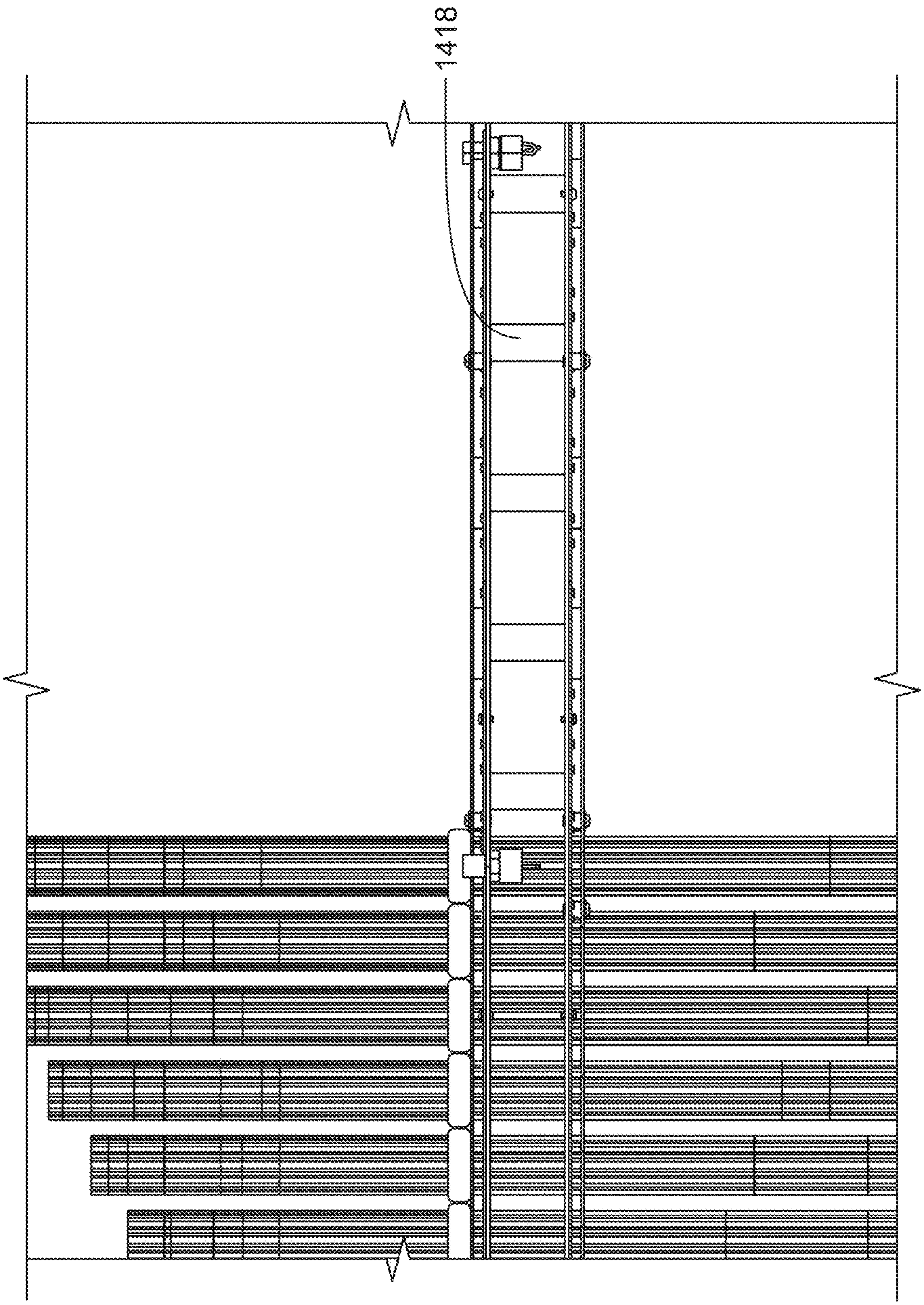
FIG. 25 shows illustrative apparatus in accordance with principles of the invention.

FIG. 25 shows a side view of illustrative lighting assembly 104 with some translucent bodies 1102 removed.

Figure 26:
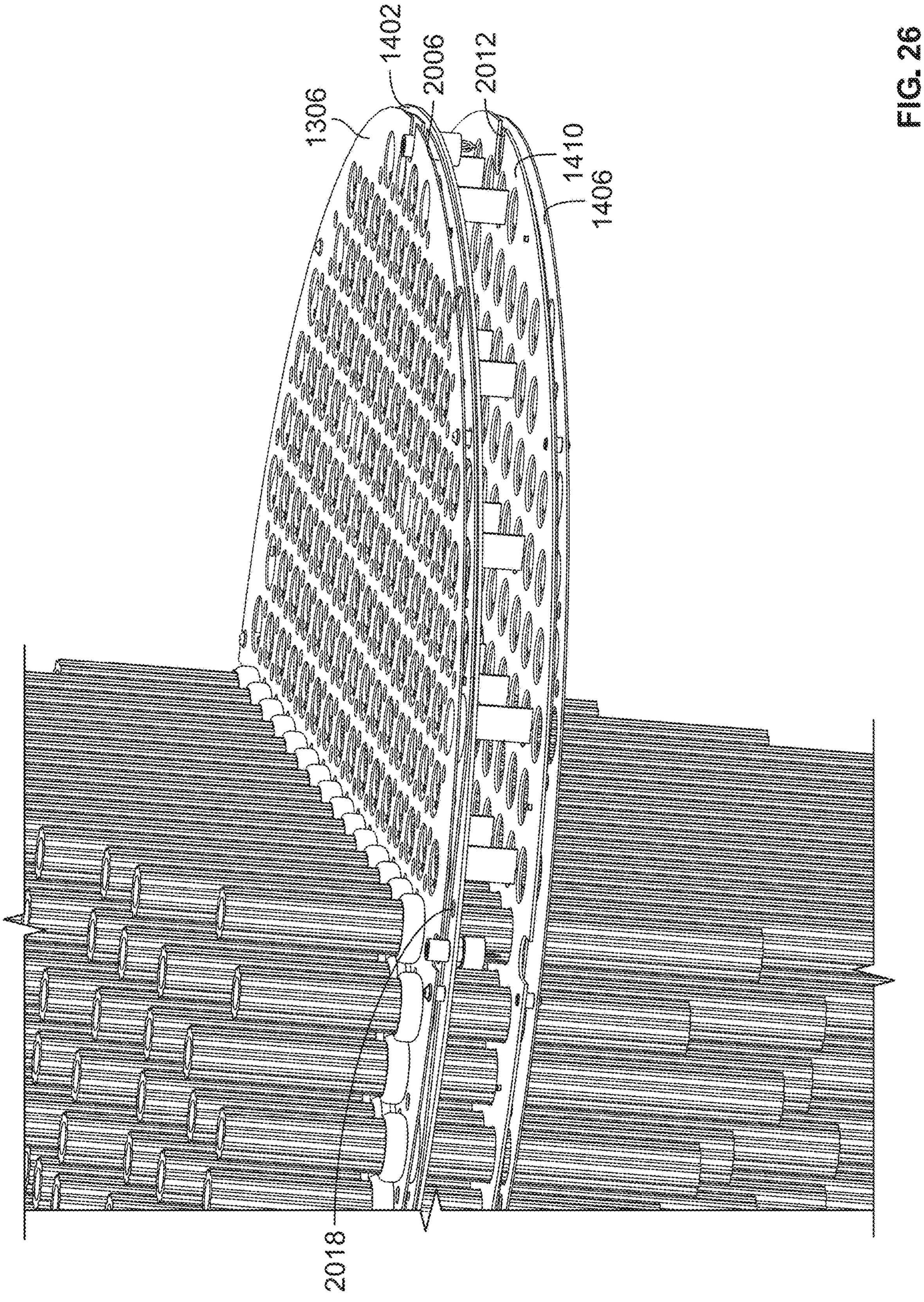
FIG. 26 shows illustrative apparatus in accordance with principles of the invention.

FIG. 26 shows a view of illustrative lighting assembly 104 with some translucent bodies 1102 and belt 1104 removed.

Figure 27:
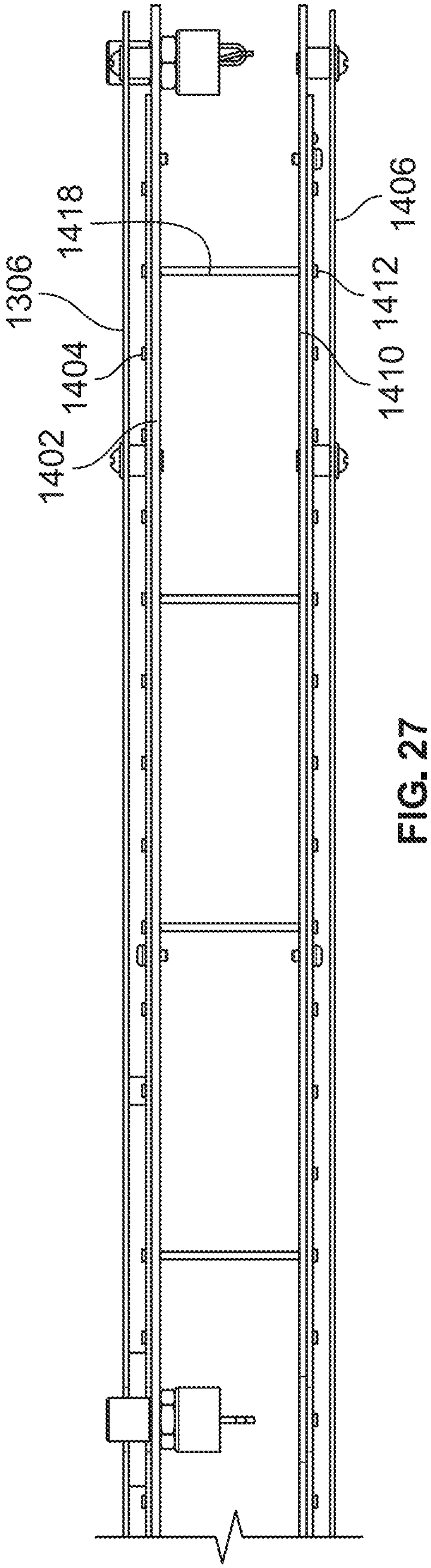
FIG. 27 shows illustrative apparatus in accordance with principles of the invention.

FIG. 27 shows a view of illustrative lighting assembly 104 with all translucent bodies 1102 and belt 1104 removed.

Figure 28:
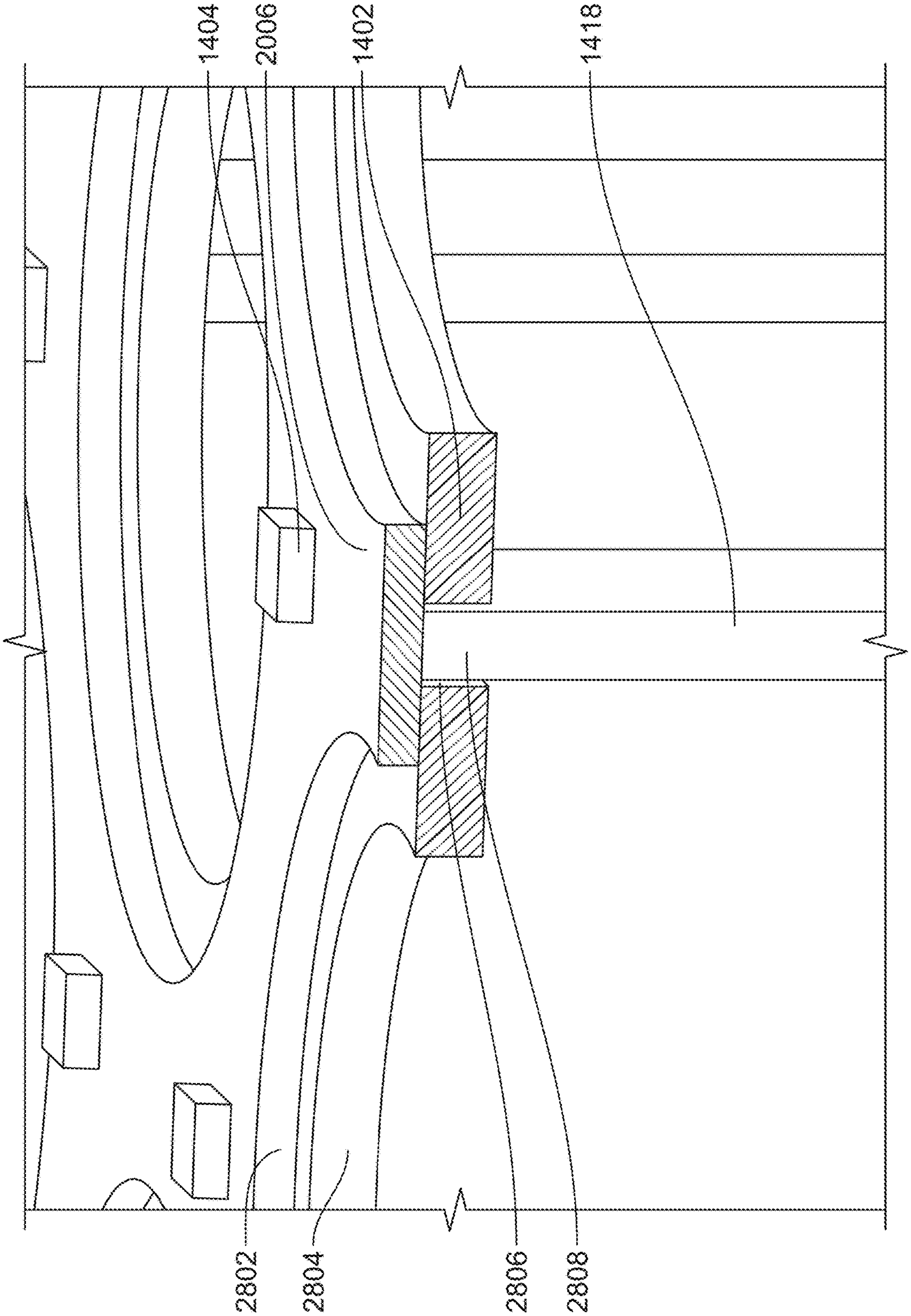
FIG. 28 shows illustrative apparatus in accordance with principles of the invention.

FIG. 28 shows a view of illustrative lighting assembly 104.

Upper circuit board 2006 may include upper spacer ring hole 2802. Upper bottom plate 1402 may include upper bottom plate body hole 2804. Spacer rings 1416 may fit within upper spacer ring hole 2802. Spacer rings 1416 may sit on upper bottom plate 1402. Upper circuit board 2006 may not be able to bear loads distributed via spacer rings 1416. Spacer rings 1416 may be fastened to upper bottom plate 1402. Spacer rings 1416 may be fastened via glue, friction fit or any other suitable means of fastening. Spacer rings 1416 may provide thermal insulation between upper bottom plate 1402 and protrusions 1302.

Upper bottom plate 1402 may include upper slot 2806. Spacer riser 1418 may include top protrusion 2808. Top protrusion 2808 may fit within upper slot 2806. Upper slot 2806 and top protrusion 2808 may align spacer riser 1418 with upper bottom plate 1402.

Figure 29:
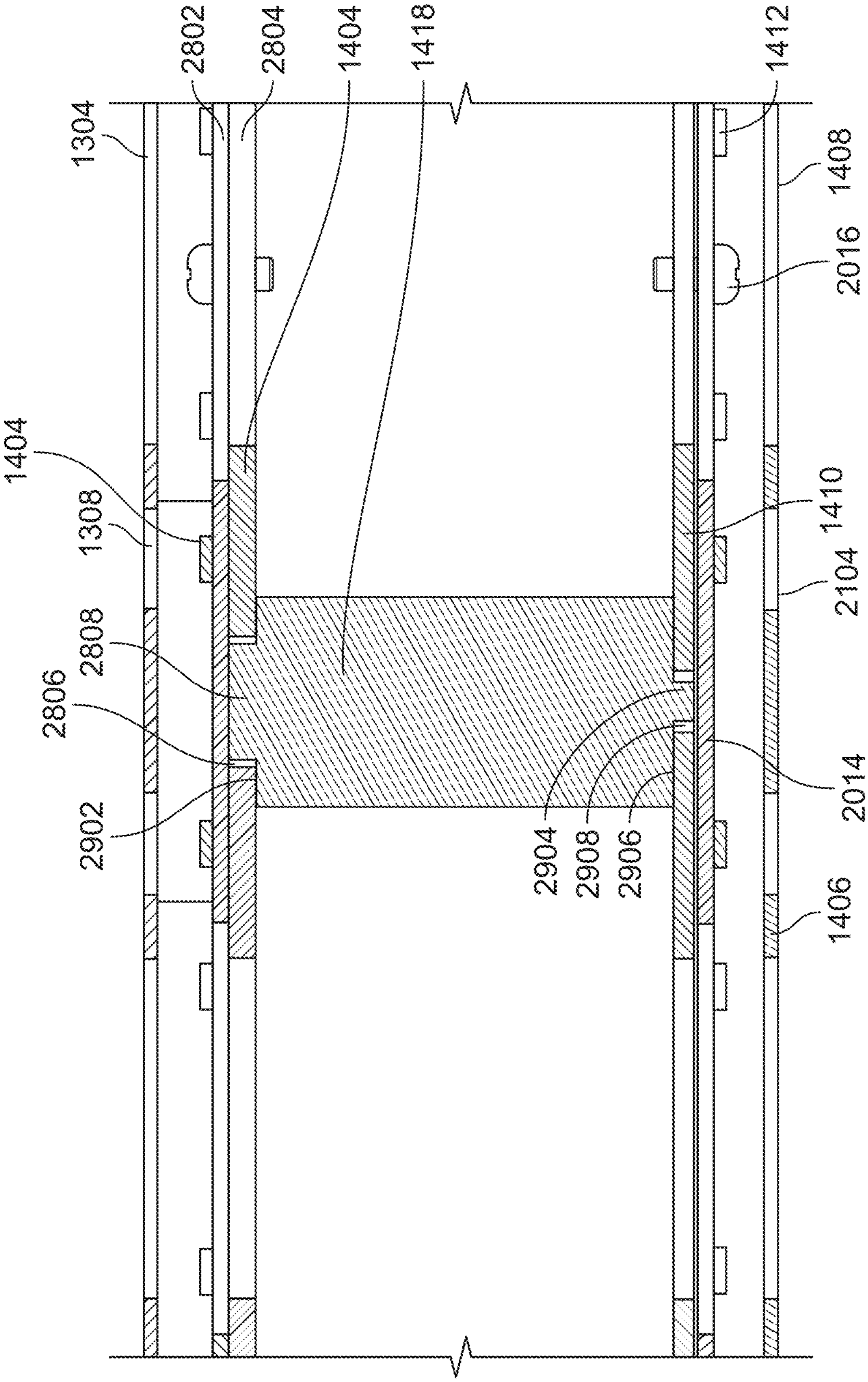
FIG. 29 shows illustrative apparatus in accordance with principles of the invention.

FIG. 29 shows a partial cross-sectional view of illustrative lighting assembly 104. Spacer riser 1418 may include one or more of top shoulder 2902, bottom protrusion 2904 and bottom shoulder 2906. Top shoulder 2902 may be connected to a bottom of upper bottom plate 1402. Top shoulder 2902 may be connected to upper bottom plate 1402 via welding. Bottom upper plate 1410 may include lower slot 2908. Bottom protrusion 2904 may fit within lower slot 2908. Lower slot 2908 and bottom protrusion 2904 may align spacer riser 1418 with lower tier top plate 1410.

Bottom shoulder 2906 may be connected to a top of lower tier top plate 1410. Bottom shoulder 2906 may be connected to lower tier top plate 1410 via welding.

Figure 30:
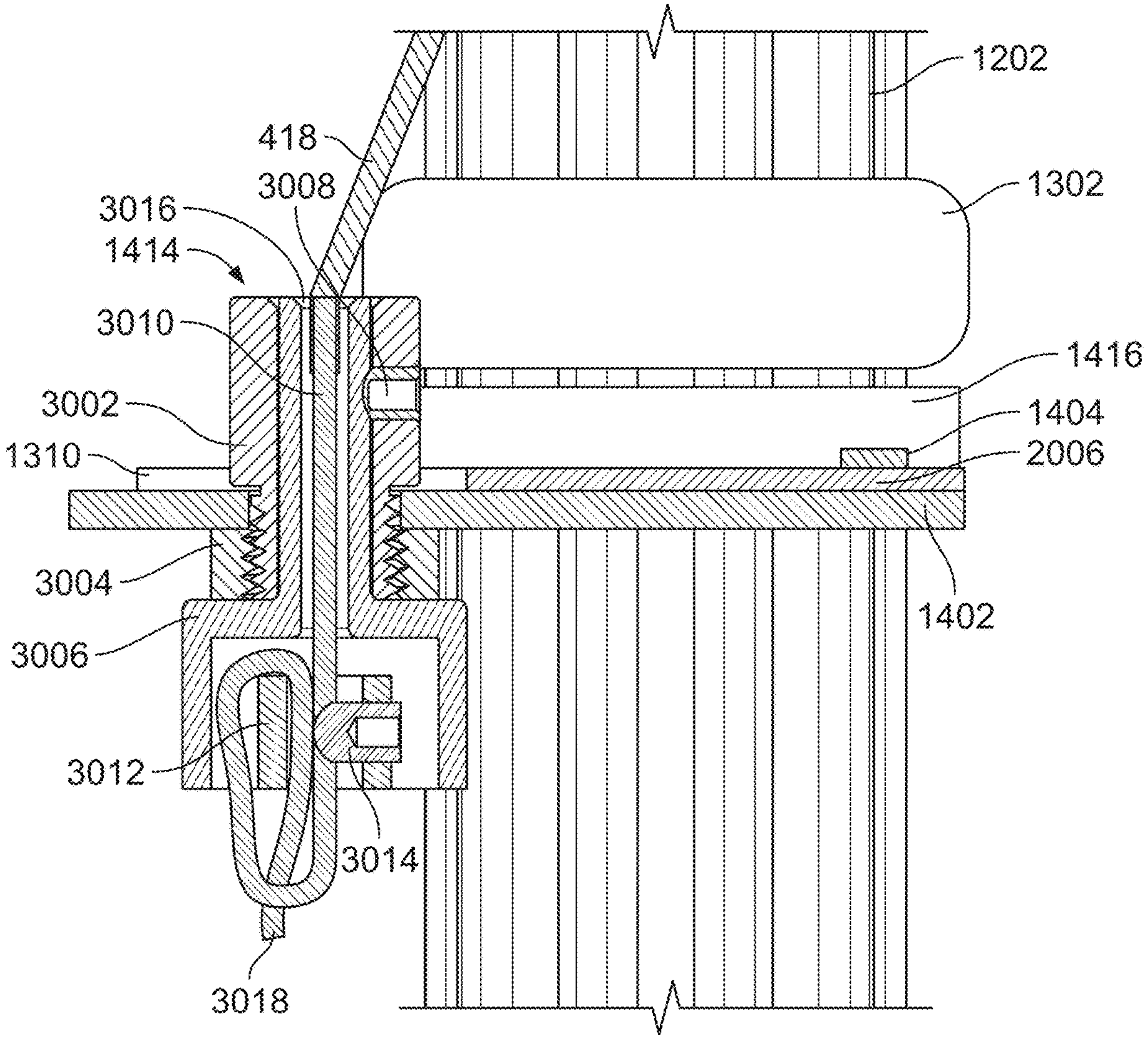
FIG. 30 shows illustrative apparatus in accordance with principles of the invention.

FIG. 30 shows a cross-sectional view of lighting assembly 104.

Plate support 1414 may include one or more of knob 3002, nut 3004, sleeve 3006, Allen screw 3008, cable 3010, anti-pull ring 3012, hex screw 3014, chamfer 3016 and terminal end 3018.

Plate support 1414 may be attached to upper bottom plate 1402. Plate support 1414 may be attached to upper bottom plate 1402 via screwing knob 3002 into nut 3004 with upper bottom plate 1402 in the middle. A lower portion of knob 3002 may be threaded. Nut 3004 may be threaded to match the lower portion of knob 3002. Sleeve 3006 may be inserted into nut 3004 and knob 3002. Sleeve 3006 may be held in place by Allen screw 3008. Sleeve 3006 may provide electrical insulation between cable 3010 and knob 3002 and upper bottom plate 1402.

Cable 3010 may be attached to wire rope 418. Cable 3010 may be an extension of wire rope 418. Cable 3010 may be held against anti-pull ring 3012 via hex screw 3014. Tightening hex screw 3014 into anti-pull ring 3012 may lock the length of wire rope 418.

Sleeve 3006 may include silicone. Sleeve 3006 may include chamfer 3016. Wire rope 418 may rest on chamfer 3016. Chamfer 3016 may reduce tension on wire rope 418 when wire rope 418 rests thereon. The silicone may reduce tension on wire rope 418.

Chamfer 3016 may be replaced with an adjustment swivel and swivel receptacle. The adjustment swivel and swivel receptacle may include one or more features in common with adjustment swivel 514 and swivel receptacle 516.

Cable 3010 may terminate at terminal end 3018. Terminal end 3018 may connect to power connections 2302 and 2402. Terminal end 3018 may connect to power connections 2302 and 2402 via a lead wire soldered to power connections 2302 and 2402 respectively. The lead wire and terminal end 3018 may be held together in a wire cap. The lead wire and terminal end 3018 may be soldered together. The lead wire and terminal end 3018 may be electrically connected in any suitable manner. The lead wire from power connection 2302 may extend through wiring hole 2018 to reach terminal end 3018. The lead wire from power connection 2402 may extend through lower tier top plate cutout 2012 to reach terminal end 3018.

Figure 31:
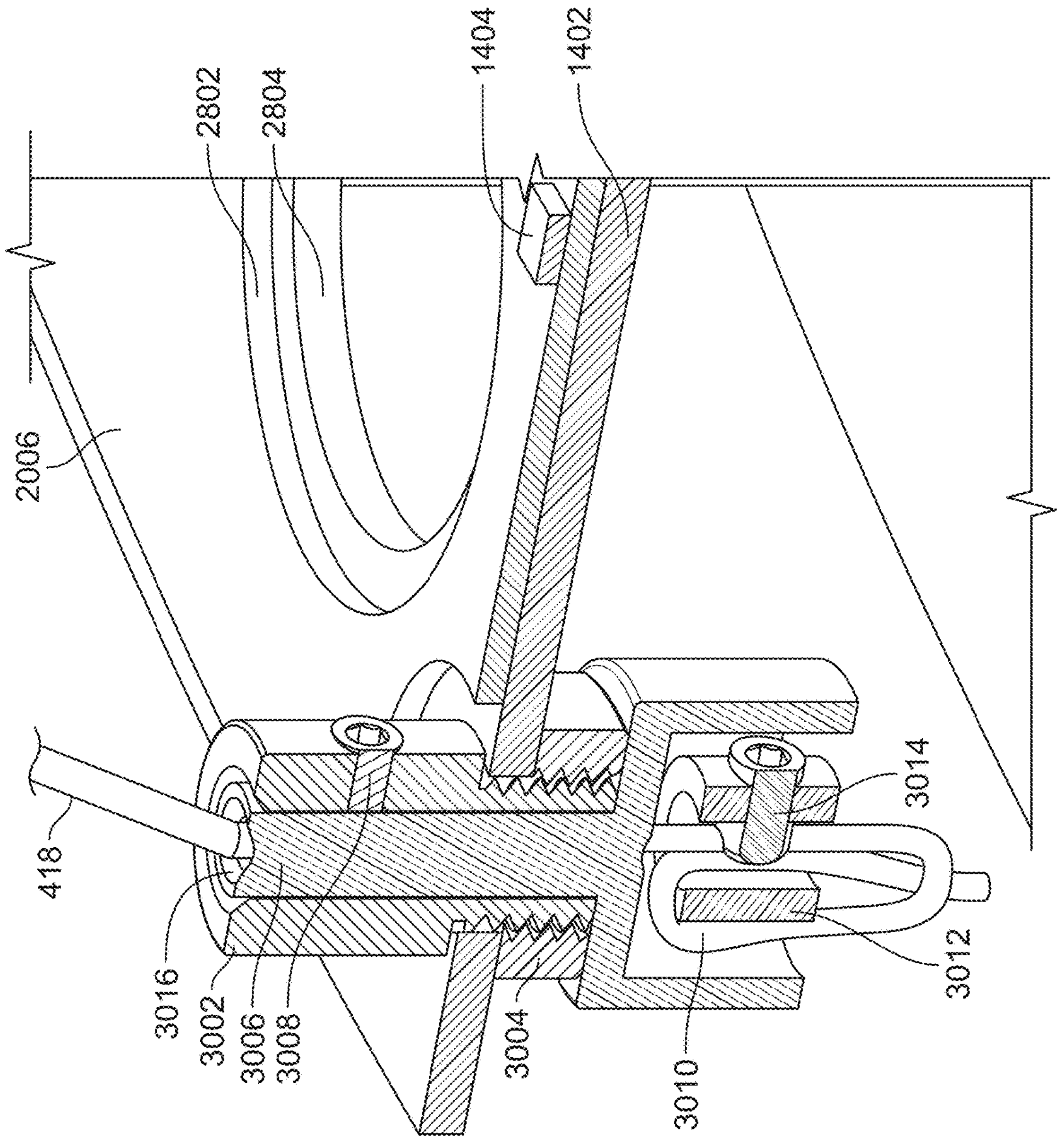
FIG. 31 shows illustrative apparatus in accordance with principles of the invention.

FIG. 31 shows a partial cross-sectional view of lighting assembly 104.

Installation of fixture 100 may include the following:

1. Installing fixture base 102 on a surface.
2. Providing lighting assembly 104 and wire ropes 418.
3a. Attaching wire ropes 418 to extensions 806 (or inserting wire rope 418 through adjustment swivel 514, adjusting height of wire ropes 418 through mounting bracket 714, tying wire ropes 418 to mounting bracket 714 to lock the height of lighting assembly 104 and connecting wire ropes 418 to lead wires 540/542).
4. Inserting adjustment swivel 514 into swivel receptacle 516.
5. Screwing swivel receptacle 516 onto inner cylinder 518.
6. Screwing nut 522 onto swivel receptacle 516 to lock bottom plate 402 onto fixture base 102.
7. Allowing lighting assembly 104 to rest on anti-pull ring 3012.
8. Inserting translucent bodies 1102 into upper tier top plate body holes 1304 and lower bottom plate body holes 1408.

Support of lighting assembly 104 may include the following:

Wire rope 418 may be connected to or be an extension of cable 3010. Anti-pull ring 3012 may lock the length of wire rope 418. Anti-pull ring 3012 may directly support sleeve 3006. Sleeve 3006 may directly support nut 3004. Nut 3004 may directly support upper bottom plate 1402. Upper bottom plate 1402 may directly support belt 1104, spacer rings 1416, spacer risers 1418, upper plate spacers 2004 and upper circuit board 2006. Upper bottom plate 1402 may be directly attached to support belt 1104, spacer rings 1416, spacer risers 1418 and upper plate spacers 2004.

Belt 1104 may directly support or partially support upper tier top plate 1306, lower bottom plate 1406 and lower tier top plate 1410. Belt 1104 may be welded to upper tier top plate 1306, lower bottom plate 1406 and lower tier top plate 1410.

Spacer rings 1416 may directly support or partially support upper tier top plate 1306. Spacer risers 1418 may directly support or partially support lower tier top plate 1410. Upper plate spacers 2004 may directly support or partially support upper tier top plate 1306.

Upper tier top plate 1306 may directly support translucent bodies 1102. Lower tier top plate 1410 may directly support lower circuit board 2014. Lower tier top plate 1410 may directly support lower plate spacers 2010. Lower tier top plate 1410 may support or partially support lower bottom plate 1406 via lower plate spacers 2010 and lower plate screws 2008.

Figure 32:
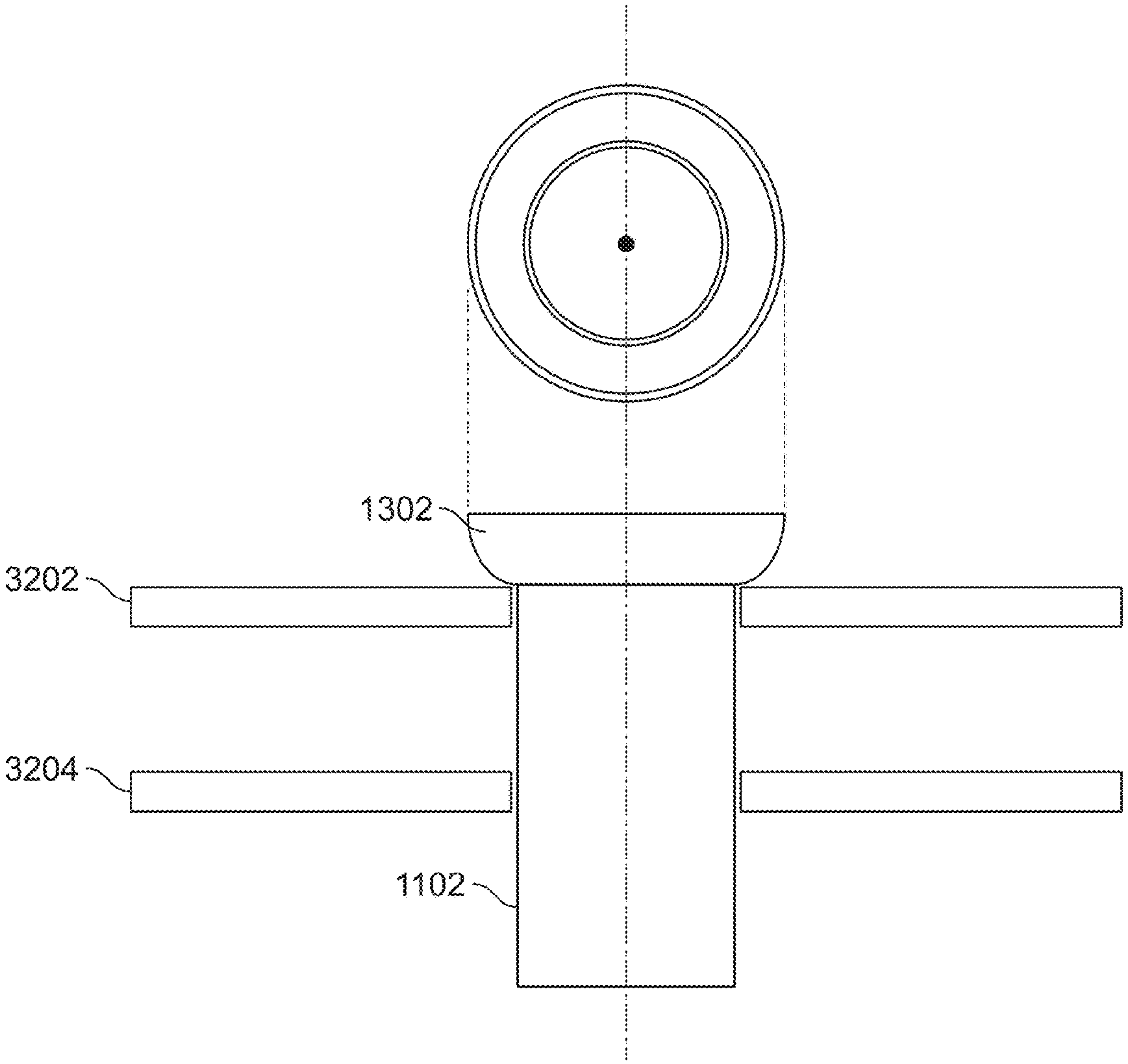
FIG. 32 shows illustrative apparatus in accordance with principles of the invention.

FIG. 32 shows side and top views of illustrative translucent body 1102. Support 3202 may support translucent body 1102. Frame 3204 may prevent translucent body 1102 from tilting.

Figure 33:
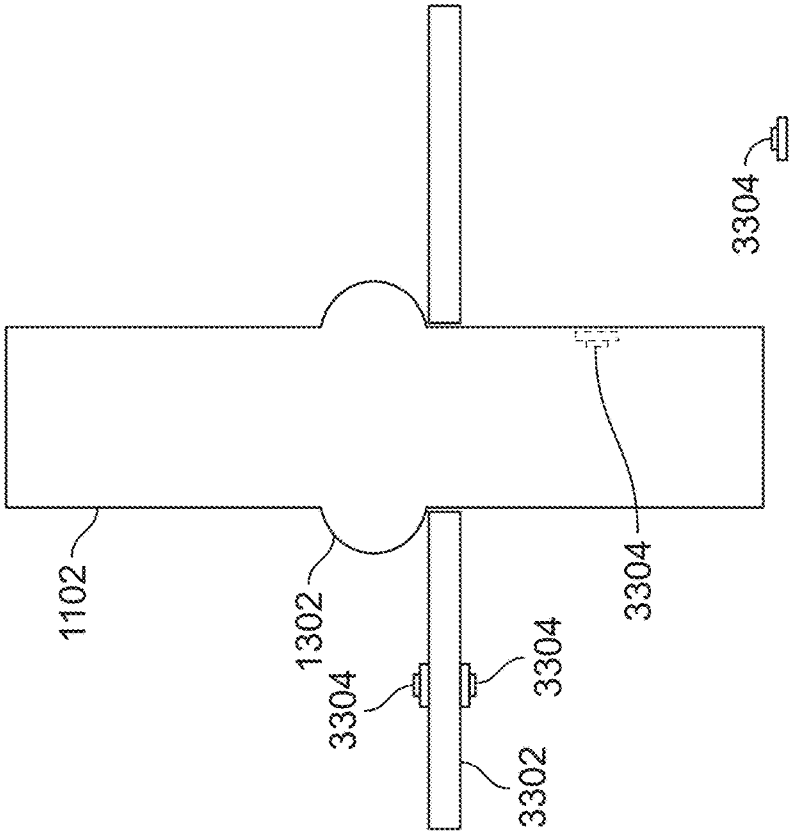
FIG. 33 shows illustrative apparatus in accordance with principles of the invention.

FIG. 33 shows a view of illustrative translucent body 1102. Support 3302 may support translucent body 1102. LEDs 3304 may be disposed on the top and bottom of support 3302. LEDs 3304 may be disposed on an inner surface of translucent body 1102. LEDs 3304 may be disposed on a location other than translucent body 1102 and support 3302.

Figure 34:
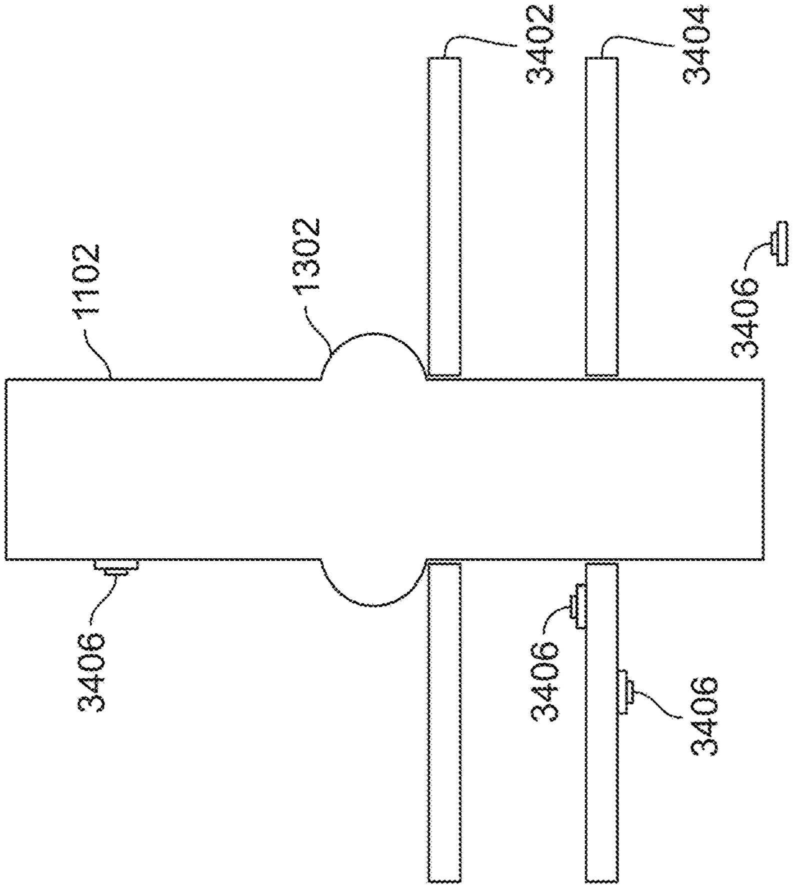
FIG. 34 shows illustrative apparatus in accordance with principles of the invention.

FIG. 34 shows a view of illustrative translucent body 1102. Support 3402 may support translucent body 1102. Frame 3404 may prevent translucent body 1102 from tilting. LEDs 3406 may be disposed on the top and bottom of frame 3404. LEDs 3406 may be disposed on an outer surface of translucent body 1102. LEDs 3406 may be disposed on a location other than translucent body 1102, support 3402 and frame 3404.

Figure 35:
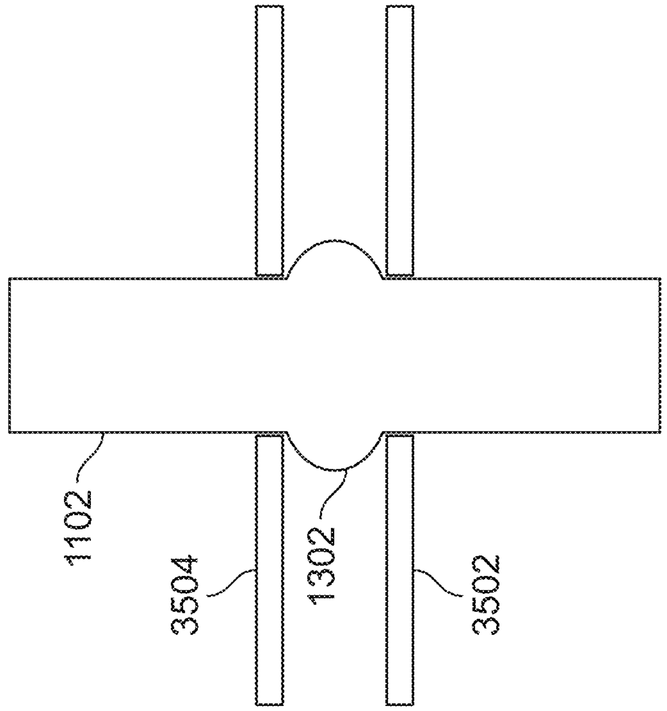
FIG. 35 shows illustrative apparatus in accordance with principles of the invention.

FIG. 35 shows a view of illustrative translucent body 1102. Translucent body 1102 may be supported by support 3502. Cover 3504 may be positioned on top of protrusion 1302. Cover 3504 may prevent translucent body 1102 from being removed.

Figure 36:
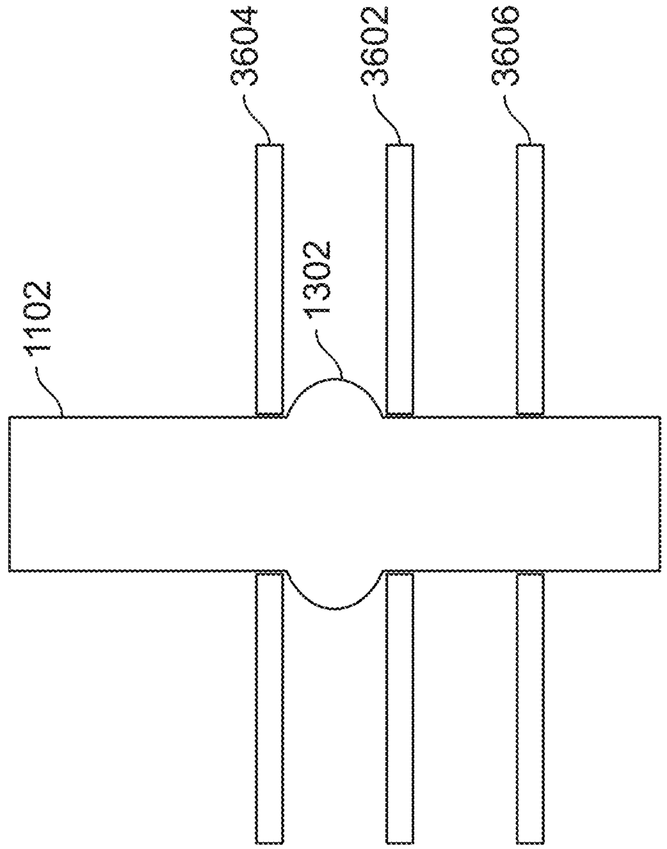
FIG. 36 shows illustrative apparatus in accordance with principles of the invention.

FIG. 36 shows a view of illustrative translucent body 1102. Support 3602 may support translucent body 1102. Cover 3604 may be positioned on top of protrusion 1302. Cover 3604 may prevent translucent body 1102 from being removed. Frame 3606 may prevent translucent body 1102 from tilting.

Figure 37:
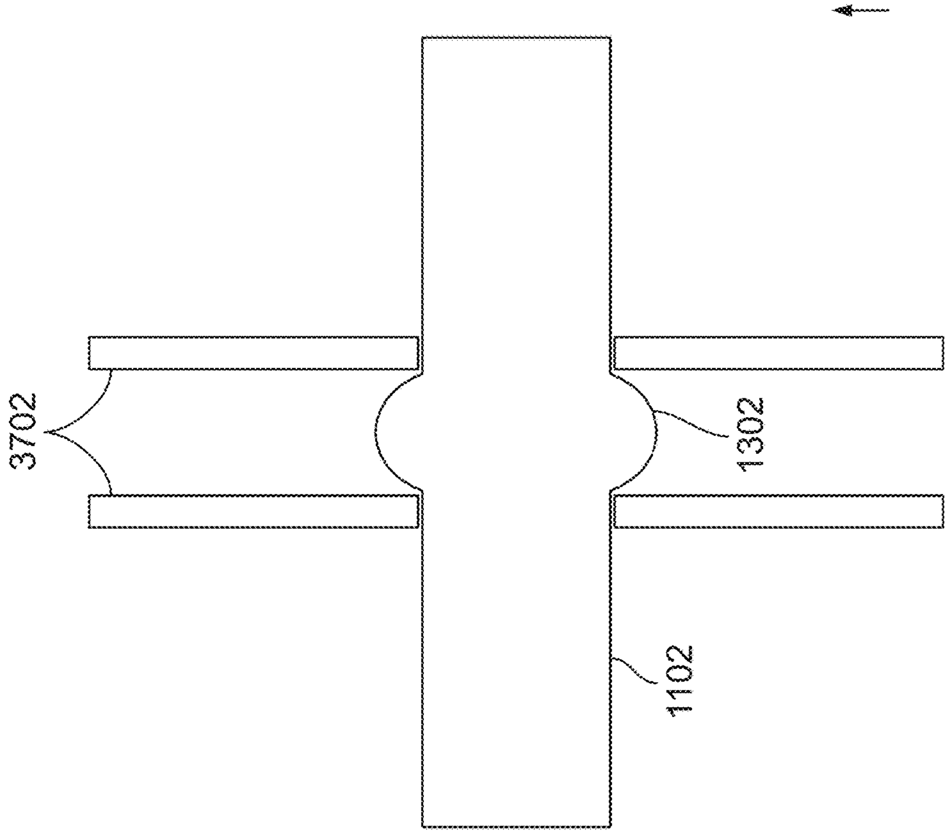
FIG. 37 shows illustrative apparatus in accordance with principles of the invention.

FIG. 37 shows a view of illustrative translucent body 1102. Translucent body 1102 may be disposed on its side. Supports 3702 may support translucent body 1102.

Figure 38:
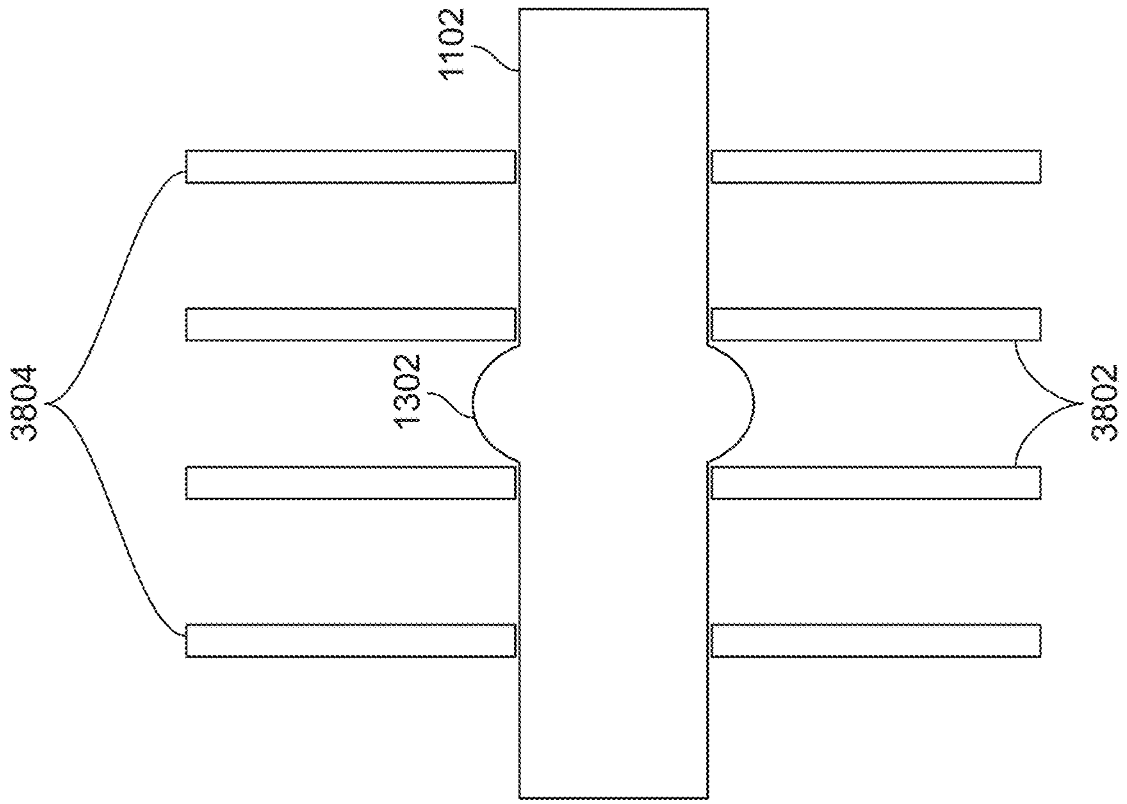
FIG. 38 shows illustrative apparatus in accordance with principles of the invention.

FIG. 38 shows a view of illustrative translucent body 1102. Translucent body 1102 may be disposed on its side. Supports 3802 may support translucent body 1102. Frames 3804 may prevent translucent body 1102 from tilting.

Figure 39:
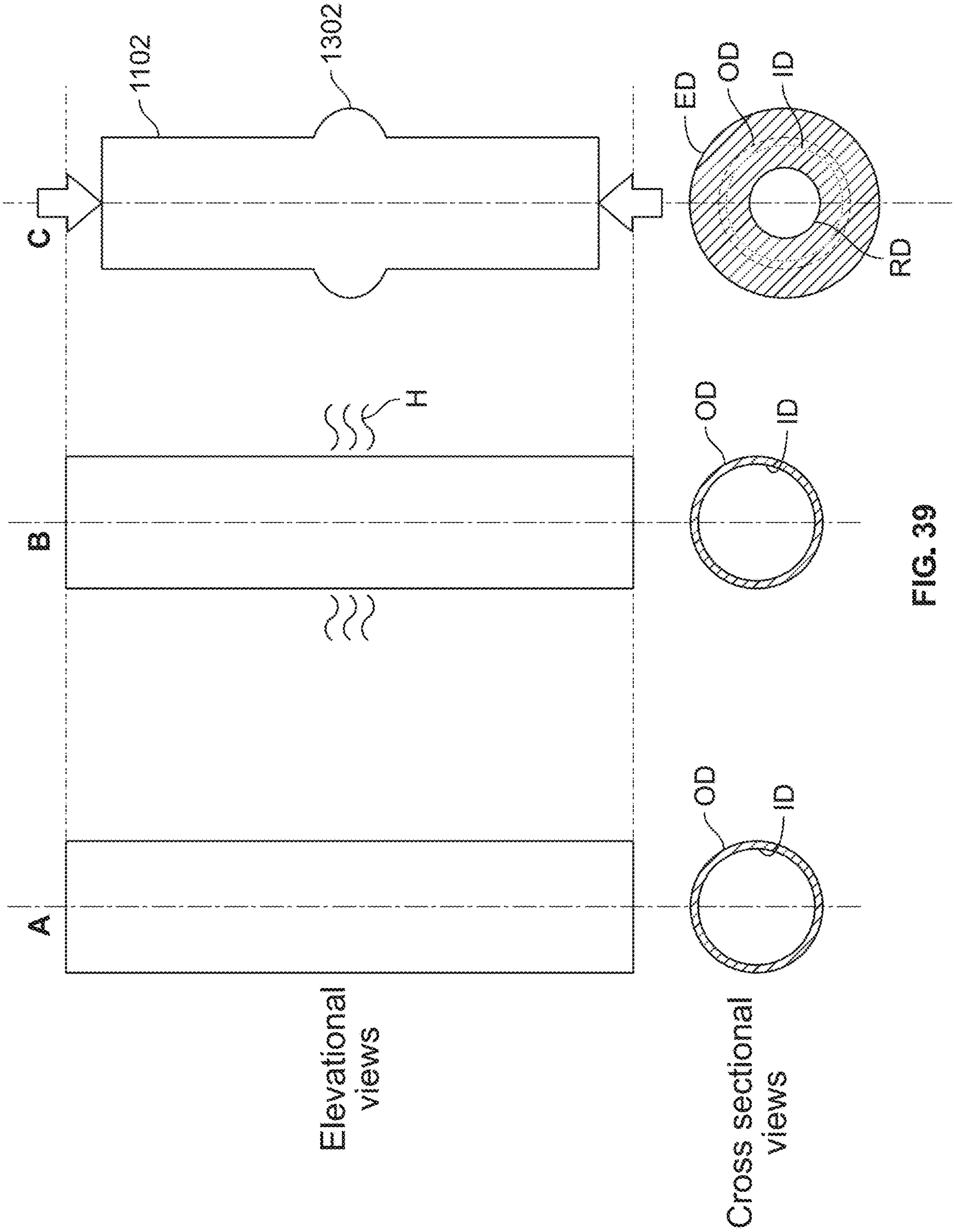
FIG. 39 shows illustrative apparatus in accordance with principles of the invention.

FIG. 39 shows illustrative stages A, B and C of the formation of protrusion 1302 on translucent body 1102. At stage A translucent body 1102 may be formed without a protrusion. At stage B heat H may be applied to a section of translucent body 1102. Heat H may be applied until the section becomes shapeable. At stage C opposing forces may be applied above and below the heated section. The forces may cause the heated section to protrude and form protrusion 1302. Protrusion 1302 may be quenched. Protrusion 1302 may be cooled. The forces may be applied until protrusion 1302 cools and hardens.

The cross-sectional view of stage A shows an inner diameter ID and outer diameter OD of translucent body 1102 before heat H is applied. The cross-sectional view of stage C shows expanded outer diameter ED and reduced inner diameter RD of translucent body 1102 after heat H is applied. Expanded outer diameter ED may be expanded relative to outer diameter OD. Reduced inner diameter RD may be reduced relative to inner diameter ID.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus and methods for lighting have been provided. Persons skilled in the art will appreciate that the present invention can be practiced by other than the described examples, which are presented for purposes of illustration rather than of limitation. The present invention is limited only by the claims that follow.

What is claimed is:

1. An apparatus comprising:
an LED light source;
a support defining a hole; and
a translucent body:
having a first extension that is configured to extend through the hole;
defining a protrusion:
from which the first extension extends; and
that is configured to obstruct passage of the translucent body through the hole; and
having a second extension that extends from the protrusion:
wherein:
the translucent body defines a longitudinal axis;
the first extension has a first diameter perpendicular to the longitudinal axis;
the second extension has a second diameter perpendicular to the longitudinal axis; and
the first diameter is equal to the second diameter.

2. The apparatus of claim 1 wherein:
the support has a planar surface; and
the hole intersects the surface.

3. The apparatus of claim 1 wherein only gravity and interference between the support and the protrusion act to obstruct passage of the translucent body through the hole.

4. The apparatus of claim 3 further comprising a frame that is spaced apart from the support and defines a passage configured to receive the first extension.

5. The apparatus of claim 1 wherein the first and second diameters are longitudinally constant along the first and second extensions, respectively.

6. The apparatus of claim 1 wherein:
the translucent body includes a wall and a hollow region interior to the wall; and
the wall defines an inner diameter and an outer diameter.

7. The apparatus of claim 6 wherein the first and second diameters are inner diameters.

8. The apparatus of claim 6 wherein the first and second diameters are outer diameters.

9. The apparatus of claim 6 wherein the wall has a greater outer diameter and a lesser outer diameter.

10. The apparatus of claim 9 wherein the first and second diameters correspond to the outer diameter.

11. The apparatus of claim 1 wherein:
the translucent body includes an interior region; and
the LED light source is disposed outside the interior region.

12. The apparatus of claim 11 wherein the LED light source is not attached directly to the translucent body.

13. The apparatus of claim 12, wherein the first extension and the protrusion together are monolithic.

14. The apparatus of claim 13 wherein the second extension is monolithic with the protrusion and the first extension.

15. The apparatus of claim 1 wherein the protrusion is translucent.

16. The apparatus of claim 1 further comprising:
when the hole is a first hole, a second hole defined by the support; and
a second translucent body:
having a third extension that is configured to extend through the second hole; and
defining a second protrusion:
from which the third extension extends; and
that is configured to obstruct passage of the second translucent body through the second hole.

17. The apparatus of claim 16 wherein:
the first extension has a first longitudinal length; and
the third extension has a second longitudinal length that is longer than the first longitudinal length.

18. The apparatus of claim 16 further comprising, when the LED light source is a first LED light source, a second LED light source, wherein:
the first LED light source is configured to emit light through a first orifice defined by the support; and
the second LED light source is configured to emit light through a second orifice defined by the support.

19. The apparatus of claim 18 wherein:
the first hole and the second hole are arranged in a row; and
the first orifice is disposed between the first hole and the second hole.

20. The apparatus of claim 1 further comprising an LED base spaced apart from the support, wherein the LED light source is disposed on the LED base.

21. The apparatus of claim 20 wherein the LED light source is configured to emit light through an orifice defined by the support.

22. The apparatus of claim 21 further comprising:
a frame that is spaced apart from the support and defines a passage configured to receive the first extension;
when the LED base is a first LED base, a second LED base spaced apart from the frame; and
when the LED light source is a first LED light source, a second LED light source disposed on the second LED base.

23. The apparatus of claim 22 wherein:
the first LED light source is configured to emit light in a first direction;
the second LED light source is configured to emit light:
in a second direction opposite the first direction; and
through an orifice in the frame; and
the first and the second directions are parallel to a central axis of the translucent body.

24. The apparatus of claim 22 further comprising a vertical spacer including:
a first end attached to the first LED base; and
a second end opposite the first end attached to the second LED base;
wherein the second LED base is configured to be supported by the first LED base via the vertical spacer.

25. The apparatus of claim 22 wherein:
the first LED light source is connected to a first circuit board; and
the second LED light source is connected to a second circuit board.

26. The apparatus of claim 25 wherein:
the first circuit board is disposed on the first LED base; and
the second circuit board is disposed on the second LED base.

27. The apparatus of claim 20 further comprising an insulating ring that:
is attached to the LED base;
electrically insulates the LED base from the support; and
is configured to support the support.

28. The apparatus of claim 27 wherein the LED base is supported by a hanging wire.

29. An apparatus comprising:

a first LED light source;

a second LED light source;

a support defining:

a first hole; and a second hole;

a first translucent body:

having a first extension that is configured to extend through the first hole; and defining a first protrusion:

from which the first extension extends; and that is configured to obstruct passage of the first translucent body through the first hole a second translucent body:

having a second extension that is configured to extend through the second hole; and defining a second protrusion:

from which the second extension extends; and that is configured to obstruct passage of the second translucent body through the second hole wherein:

the first LED light source is configured to emit light through a first orifice defined by the support; and the second LED light source is configured to emit light through a second orifice defined by the support.

30. The apparatus of claim 29 wherein:

the support has a planar surface; and the first hole and the second hole intersect the surface.

31. The apparatus of claim 29 wherein only gravity and interference between the support and the first protrusion act to obstruct passage of the first translucent body through the first hole.

32. The apparatus of claim 29 wherein only gravity and interference between the support and the second protrusion act to obstruct passage of the second translucent body through the second hole.

33. The apparatus of claim 29 further comprising a frame that is spaced apart from the support and defines:

a first passage configured to receive the first extension; and a second passage configured to receive the second extension.

34. The apparatus of claim 29 further comprising a third extension that extends from the first protrusion;

wherein:

the first translucent body defines a longitudinal axis;

the first extension has a first diameter perpendicular to the longitudinal axis;

the third extension has a second diameter perpendicular to the longitudinal axis; and the first diameter is equal to the second diameter.

35. The apparatus of claim 34 wherein the first and second diameters are longitudinally constant along the first and third extensions, respectively.

36. The apparatus of claim 34 wherein:

the first translucent body includes a wall and a hollow region interior to the wall; and the wall defines an inner diameter and an outer diameter.

37. The apparatus of claim 36 wherein the first and second diameters are inner diameters.

38. The apparatus of claim 36 wherein the first and second diameters are outer diameters.

39. The apparatus of claim 36 wherein the wall has a greater outer diameter and a lesser outer diameter.

40. The apparatus of claim 39 wherein the first and second diameters correspond to the outer diameter.

41. The apparatus of claim 34 wherein the first extension and the first protrusion together are monolithic.

42. The apparatus of claim 41 wherein the third extension is monolithic with the first protrusion and the first extension.

43. The apparatus of claim 29 further comprising a fourth extension that extends from the second protrusion;

wherein:

the second translucent body defines a longitudinal axis;

the second extension has a first diameter perpendicular to the longitudinal axis;

the fourth extension has a second diameter perpendicular to the longitudinal axis; and the first diameter is equal to the second diameter.

44. The apparatus of claim 43 wherein the first and second diameters are longitudinally constant along the second and fourth extensions, respectively.

45. The apparatus of claim 43 wherein:

the second translucent body includes a wall and a hollow region interior to the wall; and the wall defines an inner diameter and an outer diameter.

46. The apparatus of claim 45 wherein the first and second diameters are inner diameters.

47. The apparatus of claim 45 wherein the first and second diameters are outer diameters.

48. The apparatus of claim 45 wherein the wall has a greater outer diameter and a lesser outer diameter.

49. The apparatus of claim 48 wherein the first and second diameters correspond to the outer diameter.

50. The apparatus of claim 43 wherein the second extension and the second protrusion together are monolithic.

51. The apparatus of claim 50 wherein the fourth extension is monolithic with the second protrusion and the second extension.

52. The apparatus of claim 29 wherein:

the first translucent body includes a first interior region;

the first LED light source is disposed outside the first interior region;

the second translucent body includes a second interior region; and the second LED light source is disposed outside the second interior region.

53. The apparatus of claim 52 wherein:

the first LED light source is not attached directly to the first translucent body; and the second LED light source is not attached directly to the second translucent body.

54. The apparatus of claim 29 wherein the first protrusion and the second protrusion are translucent.

55. The apparatus of claim 29 wherein:

the first extension has a first longitudinal length; and the second extension has a second longitudinal length that is longer than the first longitudinal length.

56. The apparatus of claim 29 wherein:

the first hole and the second hole are arranged in a row; and the first orifice is disposed between the first hole and the second hole.

57. The apparatus of claim 29 further comprising an LED base spaced apart from the support, wherein the first LED light source and the second LED light source are disposed on the LED base.

58. The apparatus of claim 57 further comprising an insulating ring that:

is attached to the LED base;

electrically insulates the LED base from the support; and is configured to support the support.

59. The apparatus of claim 58 wherein the LED base is supported by a hanging wire.

60. The apparatus of claim 29 further comprising:

a frame that is spaced apart from the support and defines a passage configured to receive the first extension and the second extension; and a first LED base; and a second LED base spaced apart from the frame;

wherein:

the first LED light source is disposed on the first LED base; and the second LED light source is disposed on the second LED base.

61. The apparatus of claim 60 wherein:

the first LED light source is configured to emit light in a first direction;

the second LED light source is configured to emit light in a second direction opposite the first direction; and the first and the second directions are parallel to a central axis of the first translucent body.

62. The apparatus of claim 61 wherein:

the first LED light source is connected to a first circuit board; and the second LED light source is connected to a second circuit board.

63. The apparatus of claim 62 wherein:

the first circuit board is disposed on the first LED base; and the second circuit board is disposed on the second LED base.

64. The apparatus of claim 60 further comprising a vertical spacer including:

a first end attached to the first LED base; and a second end opposite the first end attached to the second LED base;

wherein the second LED base is configured to be supported by the first LED base via the vertical spacer.

65. An apparatus comprising:

a support defining a hole and an orifice;

an first LED base spaced apart from the support;

a first LED light source:

disposed on the first LED base; and configured to emit light through the orifice;

a translucent body:

having an extension that is configured to extend through the hole; and defining a protrusion:

from which the extension extends; and that is configured to obstruct passage of the translucent body through the hole a frame that is spaced apart from the support and defines a passage configured to receive the extension; and a second LED base spaced apart from the frame; and a second LED light source disposed on the second LED base.

66. The apparatus of claim 65 wherein:

the support has a planar surface; and the hole intersects the surface.

67. The apparatus of claim 65 wherein only gravity and interference between the support and the protrusion act to obstruct passage of the translucent body through the hole.

68. The apparatus of claim 65 further comprising, when the extension is a first extension, a second extension that extends from the protrusion;

wherein:

the translucent body defines a longitudinal axis;

the first extension has a first diameter perpendicular to the longitudinal axis;

the second extension has a second diameter perpendicular to the longitudinal axis; and the first diameter is equal to the second diameter.

69. The apparatus of claim 68 wherein the first and second diameters are longitudinally constant along the first and second extensions, respectively.

70. The apparatus of claim 68 wherein:

the translucent body includes a wall and a hollow region interior to the wall; and the wall defines an inner diameter and an outer diameter.

71. The apparatus of claim 70 wherein the first and second diameters are inner diameters.

72. The apparatus of claim 70 wherein the first and second diameters are outer diameters.

73. The apparatus of claim 70 wherein the wall has a greater outer diameter and a lesser outer diameter.

74. The apparatus of claim 73 wherein the first and second diameters correspond to the outer diameter.

75. The apparatus of claim 68 further comprising:

when the hole is a first hole, a second hole defined by the support; and a second translucent body:

having a third extension that is configured to extend through the second hole; and defining a second protrusion:

from which the third extension extends; and that is configured to obstruct passage of the second translucent body through the second hole.

76. The apparatus of claim 75 wherein:

when the extension is a first extension, the first extension has a first longitudinal length; and the third extension has a second longitudinal length that is longer than the first longitudinal length.

77. The apparatus of claim 75 further comprising, when the orifice is a first orifice, a second orifice defined by the support, wherein:

the first LED light source is configured to emit light through the first orifice; and the second LED light source is configured to emit light through the second orifice.

78. The apparatus of claim 77 wherein:

the first hole and the second hole are arranged in a row; and the first orifice is disposed between the first hole and the second hole.

79. The apparatus of claim 75 wherein:

The second translucent body includes an interior region; and the second LED light source is disposed outside the interior region.

80. The apparatus of claim 79 wherein the second LED light source is not attached directly to the second translucent body.

81. The apparatus of claim 65 wherein:

the translucent body includes an interior region; and the first LED light source is disposed outside the interior region.

82. The apparatus of claim 81 wherein the first LED light source is not attached directly to the translucent body.

83. The apparatus of claim 82 wherein the extension and the protrusion together are monolithic.

84. The apparatus of claim 83 further comprising, when the extension is a first extension, a second extension that:

is monolithic with the protrusion and the first extension; and extends from the protrusion.

85. The apparatus of claim 65 wherein the protrusion is translucent.

86. The apparatus of claim 65 further comprising an insulating ring that:

is attached to the first LED base;

electrically insulates the first LED base from the support; and is configured to support the support.

87. The apparatus of claim 86 wherein the first LED base is supported by a hanging wire.

88. The apparatus of claim 65 wherein:

the first LED light source is configured to emit light in a first direction;

the second LED light source is configured to emit light: in a second direction opposite the first direction; and through an orifice in the frame; and the first and the second directions are parallel to a central axis of the translucent body.

89. The apparatus of claim 65 further comprising a vertical spacer including:

a first end attached to the first LED base; and a second end opposite the first end attached to the second LED base;

wherein the second LED base is configured to be supported by the first LED base via the vertical spacer.

90. The apparatus of claim 65 wherein:

the first LED light source is connected to a first circuit board; and the second LED light source is connected to a second circuit board.

91. The apparatus of claim 90 wherein:

the first circuit board is disposed on the first LED base; and the second circuit board is disposed on the second LED base.

* * * * *